（12) United States Patent
Kawamura

(10) Patent No.: US 10,310,984 B2
(45) Date of Patent: Jun. 4, 2019

(54) STORAGE APPARATUS AND STORAGE CONTROL METHOD

(71) Applicant: Hitachi, Ltd., Tokyo (JP)

(72) Inventor: Atsushi Kawamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 321 days.

(21) Appl. No.: 15/510,594

(22) PCT Filed: Oct. 9, 2014

(86) PCT No.: PCT/JP2014/077075
§ 371 (c)(1),
(2) Date: Mar. 10, 2017

(87) PCT Pub. No.: WO2016/056104
PCT Pub. Date: Apr. 14, 2016

(65) Prior Publication Data
US 2017/0192903 A1      Jul. 6, 2017

(51) Int. Cl.
*G06F 12/1027*      (2016.01)
*G06F 12/10*         (2016.01)
*G06F 12/02*         (2006.01)

(52) U.S. Cl.
CPC .......... *G06F 12/10* (2013.01); *G06F 12/0246* (2013.01); *G06F 12/1027* (2013.01);
(Continued)

(58) Field of Classification Search
None
See application file for complete search history.

(56) References Cited

U.S. PATENT DOCUMENTS

| 2005/0021929 A1* | 1/2005 | Yamada ............. G06F 9/30145 712/209 |
| 2007/0168624 A1 | 7/2007 | Kaler |
| 2013/0246689 A1 | 9/2013 | Matsudaira et al. |

FOREIGN PATENT DOCUMENTS

| JP | 2005-301885 A | 10/2005 |
| JP | 2013-196115 A | 9/2013 |

OTHER PUBLICATIONS

International Search Report and Written Opinion for PCT App No. PCT/JP2014/077075 dated Dec. 22, 2014, 6 pgs.
(Continued)

*Primary Examiner* — Brian R Peugh
(74) *Attorney, Agent, or Firm* — Procopio, Cory, Hargreaves & Savitch LLP

(57) ABSTRACT

A storage apparatus includes a first storage device and a second storage device, out of logical-physical translation information which associates a logical page and a physical page in the second storage device with each other. Non-compressed logical-physical translation information in the first storage device is assumed to constitute a first tier, compressed logical-physical translation information in the first storage device is assumed to constitute a second tier, and compressed logical-physical translation information in the second storage device is assumed to constitute a third tier. The storage apparatus includes tier management information for managing which logical page is included in logical-physical translation information of which of the first tier, the second tier, and the third tier. When receiving an I/O with respect to the logical page, the storage apparatus retrieves the logical-physical translation information including the logical page for which the I/O has been received, based on the tier management information.

10 Claims, 24 Drawing Sheets

(52) U.S. Cl.
CPC ............... *G06F 2212/7201* (2013.01); *G06F 2212/7202* (2013.01); *G06F 2212/7203* (2013.01)

(56) References Cited

OTHER PUBLICATIONS

Gupta, A., et al., DFTL: A Flash Translation Layer Employing Demand-based Selective Caching of Page-level Address Mappings, ASPLOS'09, Mar. 7-11, 2009, Washington, DC, 12 pgs.

\* cited by examiner

Fig. 11

Tier management table    901

| ID | Storage destin-ation | State | Memory address | First FM addr-ess | Second FM add-ress | Length | For-ward pointer | Rea-rward pointer | Frequ-ency | |
|---|---|---|---|---|---|---|---|---|---|---|
| | 1101 | 1102 | 1103 | 1104 | 1105 | 1106 | 1107 | 1108 | 1109 | 1110 |
| | | | | | | | | | | 910a |
| 0 | Main memory | Non-compress-ed Dirty | 0x001 | 0x003 | 0x006 | 16 | 100 | 10 | 10 | 910b |
| 1 | Main memory | Com-pressed Clean | 0x002 | 0x004 | 0x007 | 8 | 200 | 20 | 5 | 910c |
| 2 | FM | Compr-essed | NULL | 0x005 | 0x008 | 5 | 300 | 30 | 1 | 910d |
| 3 | - | Unallo-cated | NULL | NULL | NULL | - | - | - | - | |
| | | | | ... | | | | | | |

Fig. 14
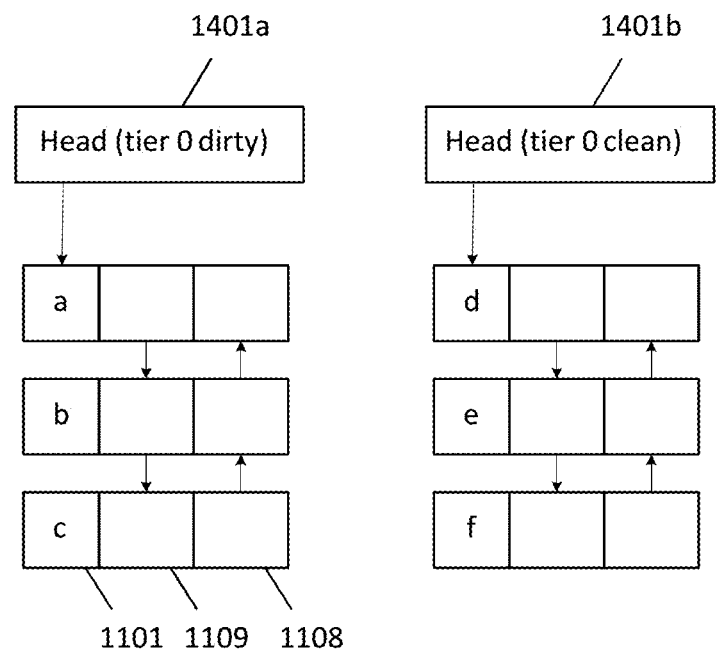
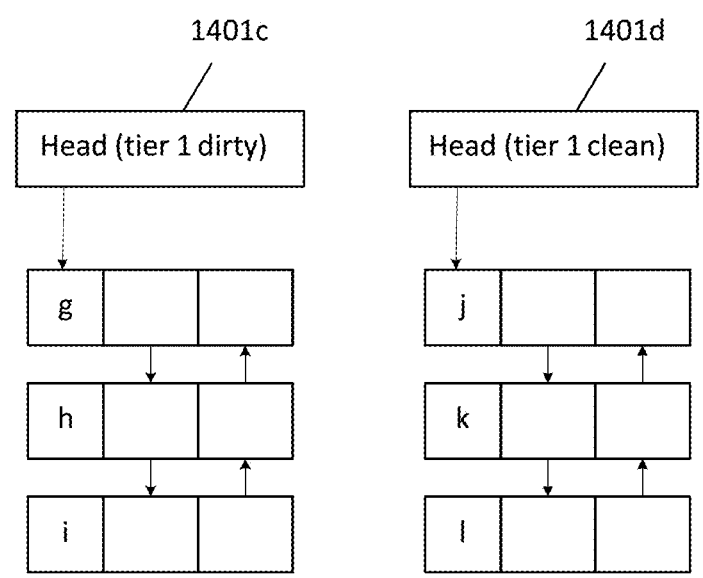

Fig. 24

Tier management table 901b

| ID | 1101 Storage location | 1102 State | 1103 Memory address | 1104 First FM address | 1105 Second FM address | 1106 Length | 1107 Forward ptr | 1108 Rearward ptr | 1109 Frequency | 1110 Priority 1111 |
|---|---|---|---|---|---|---|---|---|---|---|
| 0 | DRAM | Non-compressed Dirty | 0x001 | 0x003 | 0x006 | 16 | 100 | 10 | 10 | High |
| 1 | DRAM | Compressed Clean | 0x002 | 0x004 | 0x007 | 8 | 200 | 20 | 5 | Intermediate |
| 2 | FM | Compressed | NULL | 0x005 | 0x008 | 5 | 300 | 30 | 1 | Low |
| 3 | - | Unallocated | NULL | NULL | NULL | - | - | - | - | - |

...

STORAGE APPARATUS AND STORAGE CONTROL METHOD

CROSS-REFERENCE TO RELATED APPLICATIONS

This application is a U.S. National Stage entry of PCT Application No. PCT/JP2014/077075, filed on Oct. 9, 2014. The contents of the foregoing are incorporated by reference.

TECHNICAL FIELD

The present invention relates to a storage apparatus and a storage control method.

BACKGROUND ART

Non-volatile semiconductor memories employing a NAND flash memory chip (hereinafter, referred to as "flash memories") are known. With a flash memory, data is written and read in units called physical pages while data is erased in units called blocks which are constituted by a plurality of physical pages.

In a flash memory, due to the properties thereof, it is impossible to directly rewrite data that has already been written onto a physical page. Thus, rewriting of data of a flash memory is performed by writing data in a free physical page. With this method, the number of free physical pages in the flash memory decreases every time rewriting is performed. Therefore, unnecessary data in the flash memory must be erased in block units so as to restore free physical pages. This process is referred to as reclamation. Reclamation is performed according to the following procedure. (1) Data of a valid physical page in a block is duplicated to a physical page of another block. (2) Data of all physical pages in the block is erased.

As described above, with a flash memory, data of a certain physical page is migrated to another physical page. For this purpose, a flash memory includes a logical-physical translation table for translating an address of a logical page (a logical address) to an address of a physical page (a physical address). When a flash memory receives a write request regarding a logical address, the flash memory uses the logical-physical translation table to translate the logical address to a physical address and writes data to a physical page associated with the physical address. In addition, when a flash memory executes reclamation and migrates data of a certain physical page to another physical page, the flash memory changes the correspondence between a logical page and a certain physical page (a migration source) in the logical-physical translation table to a correspondence between the logical page and another physical page (a migration destination). In this manner by using a logical-physical translation table, a flash memory hides migration of data between physical pages inside the flash memory, from the outside.

A data size of a logical-physical translation table tends to increase as a capacity of a flash memory increases. PTL 1 describes increasing a logical capacity of a flash memory by compressing user data to be stored in the flash memory. When a logical capacity is increased in this manner, the data size of a logical-physical translation table further increases. Therefore, a logical-physical translation table with a large data size ends up oppressing the capacity of a main memory (for example, a DRAM). In regards to this issue, NPL 1 describes evacuating a part of a logical-physical translation table from a main memory to a flash memory and reading (staging) the evacuated part to the main memory when necessary. Accordingly, the logical-physical translation table with a large data size can be prevented from oppressing the capacity of the main memory.

CITATION LIST

Patent Literature

[PTL 1]
US2007/0168624

Non Patent Literature

[NPL1]
DFTL: A Flash Translation Layer Employing Demand-based Selective Caching of Page-level Address Mappings

SUMMARY OF INVENTION

Technical Problem

However, increasing an amount of a logical-physical translation table to be evacuated to a flash memory and reducing an amount of the logical-physical translation table to remain in a main memory reduces a hit probability of the logical-physical translation table in the main memory and causes a decline in I/O (Input/Output) response performance. In addition, when a data size of the logical-physical translation table to be evacuated to the flash memory increases, a capacity of the flash memory for storing user data decreases accordingly. Furthermore, an increase in a write amount to the flash memory caused by the evacuation of the logical-physical translation table to the flash memory also has an adverse effect on a lifetime of the flash memory.

In consideration thereof, an object of the present invention is to provide a storage apparatus and a storage control method which suppress degradation of I/O response performance which may occur when a data size of logical-physical translation information increases. Another object of the present invention is to provide a storage apparatus and a storage control method which suppress degradation of I/O response performance which may occur when managing logical-physical translation information using a first storage device and a second storage device.

Solution to Problem

A storage apparatus according to an embodiment includes a first storage device, a second storage device, and a controller configured to control the first storage device and the second storage device.

The controller is configured to include logical-physical translation information which associates a logical page constituting a logical storage area of the second storage device and a physical page constituting a physical storage area of the second storage device with each other.

In the logical-physical translation information, the logical-physical translation information stored in a non-compressed state in the first storage device belongs to a first tier, the logical-physical translation information stored in a compressed state in the first storage device belongs to a second tier, and the logical-physical translation information stored in a compressed state in the second storage device belongs to a third tier.

In addition, the controller is configured to include tier management information for managing which logical page is included in logical-physical translation information of which of the first tier, the second tier, and the third tier.

Furthermore, the controller is configured to, when receiving an I/O with respect to the logical page, retrieve the logical-physical translation information including the logical page for which the I/O has been received based on the tier management information.

The second storage device may be configured to have a slower I/O rate and a larger storage capacity than the first storage device.

Advantageous Effects of Invention

According to the present invention, degradation of I/O response performance which may occur when a data size of logical-physical translation information increases can be suppressed. In addition, according to the present invention, degradation of I/O response performance which may occur when managing logical-physical translation information using a first storage device and a second storage device can be suppressed.

BRIEF DESCRIPTION OF DRAWINGS

FIG. 11 shows a configuration example of a tier management table.

FIG. 14 shows a configuration example of a queue used when selecting logical-physical translation information for staging/destaging.

FIG. 24 shows a modification example of a configuration of a tier management table.

DESCRIPTION OF EMBODIMENT

Hereinafter, an embodiment will be described. Moreover, although information may be described below using expressions such as an "xxx table", the information may be expressed in a different form to a table or other relevant data structures. Therefore, in order to show that information is not dependent on data structure, an "xxx table", for example, may sometimes be referred to as "xxx information".

In addition, although a description may be given below using an "xxx unit" as a subject, the "xxx unit" may be constituted by a computer program (referred to as a "program"). Since a program performs a prescribed process using a memory and a communication port (a network I/F) by being executed by a processor, a processor or a CPU (Central Processing Unit) may be used instead as a subject in the description. In addition, a process disclosed using a program as a subject may be considered a process performed by a computer such as a monitoring system. Furthermore, a program may be partially or entirely realized by dedicated hardware. Moreover, various programs may be installed in each computer from a program distribution server or via a computer-readable storage medium.

In addition, in the following description, reference signs of a plurality of elements of a same type are combinations of a same parent number and a different child sign. When describing elements of a same type without distinguishing among the elements, only the parent number of the reference sign may be used, and when describing elements while distinguishing among the elements, an entire reference sign may be used.

Furthermore, in the following description, when describing elements of a same type while distinguishing the elements from one another, reference signs such as "xxx 200a" and "xxx 200b" may be used. However, when describing elements of a same type without distinguishing the elements from one another, only a shared number among the reference signs such as "xxx 200" may be used.

Figure 1:
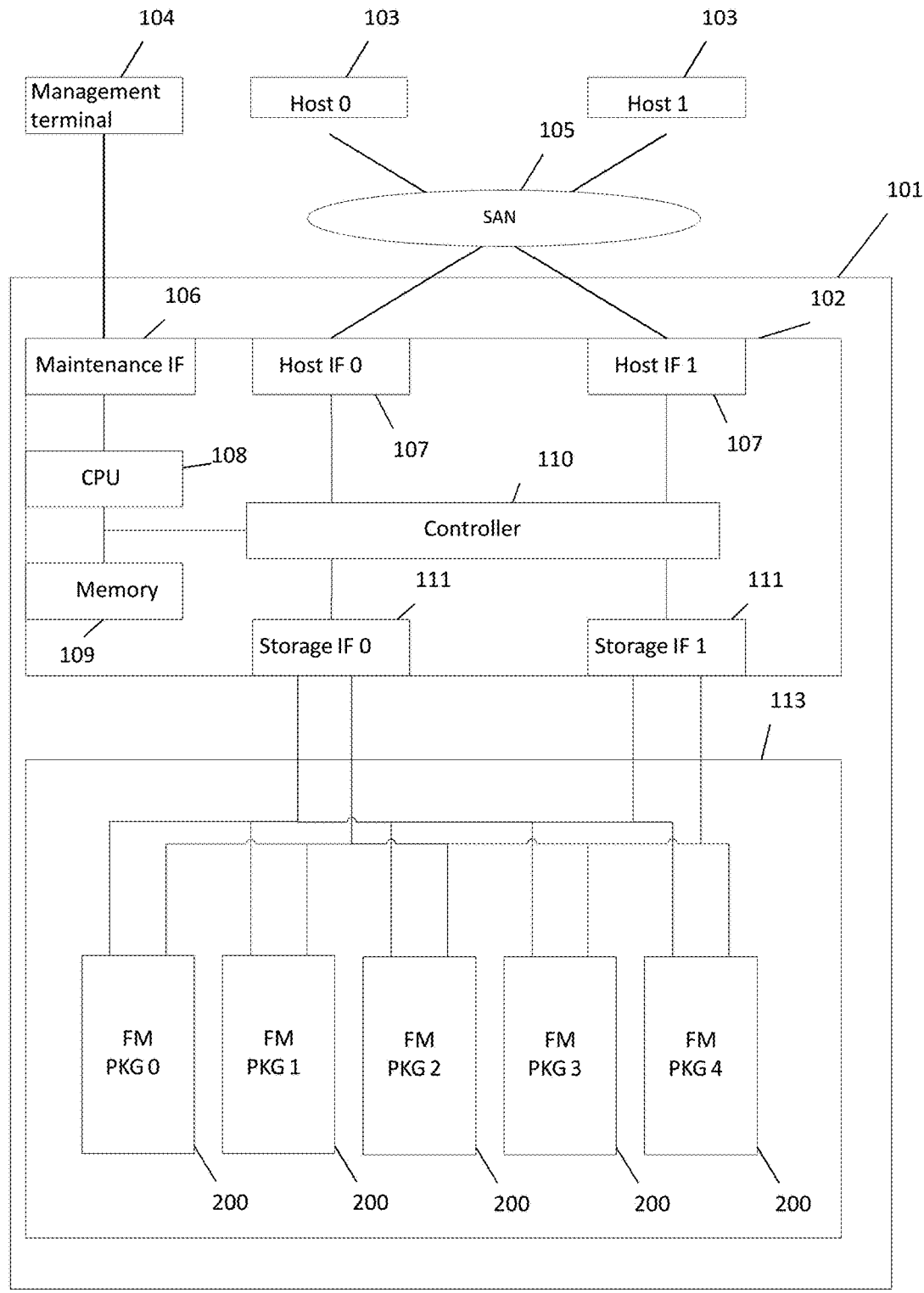
FIG. 1 shows a configuration of a computer system according to the present embodiment.

FIG. 1 shows a configuration of a computer system according to the present embodiment.

The computer system includes a storage system 101, one or more host computers 103a and 103b, and a management terminal 104. The host computers 103a and 103b are coupled to the storage system 101 via a SAN (Storage Area Network) 105.

The storage system 101 includes a storage controller 102 and a flash memory storage apparatus 113. The flash memory storage apparatus 113 is constituted by one or more flash memory packages 200. Hereinafter, the flash memory package 200 may be referred to as the FMPKG 200. Moreover, while the computer system according to the present embodiment is configured to include one storage controller 102, a redundant configuration including a plurality of storage controllers 102 may be adopted.

The storage controller 102 includes a CPU (Central Processing Unit) 108, a memory 109, a plurality of host IFs (Interfaces) 107a and 107b, a plurality of storage IFs 111a and 111b, and a maintenance IF 106. The respective components in the storage controller 102 are coupled via a bus that enables two-way data communication. The main memory 109 includes an area for storing a program that controls the storage system 101 and an area (a cache memory area) for temporarily storing data. The CPU 108 controls the storage system 101 in accordance with the program stored in the memory 109.

The host IF 107 is an interface used by the storage controller 102 to communicate with the host computer 103. The maintenance IF 106 is an interface used by the storage controller 102 to communicate with the management terminal 104. The maintenance IF 106 and the management terminal 104 may be coupled by a prescribed communication line or a prescribed communication network.

A manager performs management, maintenance, and the like of the storage controller 102 from the management terminal 104. However, the computer system need not include the management terminal 104. In this case, the manager may perform management, maintenance, and the like of the storage controller 102 from the host computer 103.

The computer system shown in FIG. 1 is configured so that the host computer 103 and the FMPKG 200 are coupled to each other via the storage controller 102. However, the computer system may be configured without the storage controller 102 so that the host computer 103 and the FMPKG 200 are directly coupled to each other.

Figure 2:
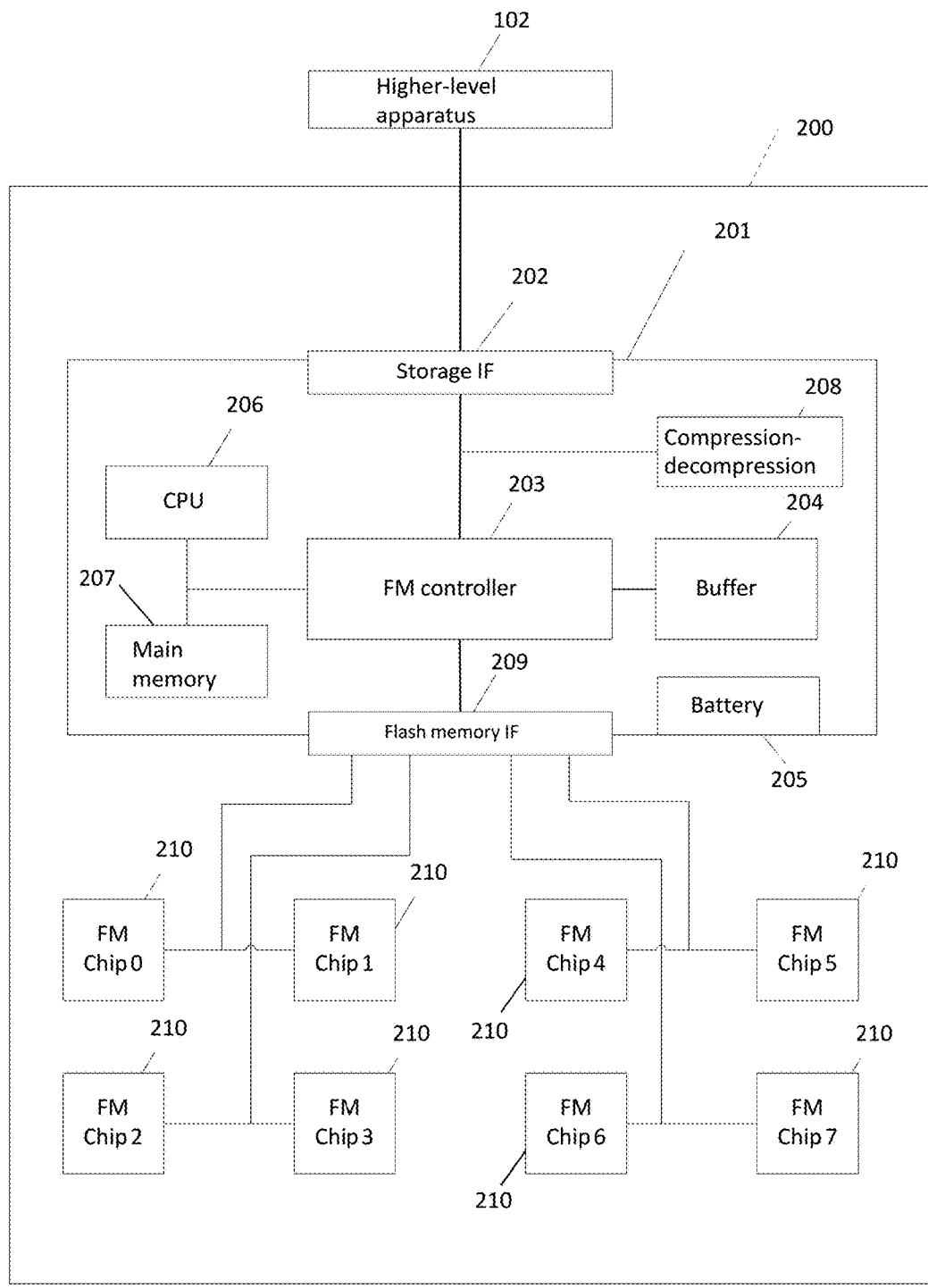
FIG. 2 shows a configuration of a flash memory package.

FIG. 2 shows a configuration of the FMPKG 200.

The FMPKG 200 includes a flash memory control apparatus 201 and one or more flash memories 210.

The flash memory control apparatus 201 includes a storage IF 202 for communicating with a higher-level apparatus 102, an FM controller 203, a buffer 204, a battery 205 for supplying power during an emergency, a CPU 206, a main memory 207, a flash memory IF 209 for coupling to the flash memory 210, and a compression-decompression circuit 208.

The CPU 206 is a processor which controls the entire flash memory control apparatus 201 and which operates based on a microprogram stored in the main memory 207. For example, when the CPU 206 receives an I/O from the higher-level apparatus 102, the CPU 206 refers to logical-physical translation information stored in the main memory 207 or the flash memory 210 and reads or writes user data from or to the flash memory 210. In addition, the CPU 206 executes reclamation, wear leveling, and the like in accordance with usage of the flash memory 210. Details of the logical-physical translation information will be described later.

The flash memory controller (hereinafter, referred to as an "FM controller") 203 is controlled by the CPU 206. The FM controller 203 reads and writes data from and to the flash memory 210 through the flash memory IF 209. The FM controller 203 transmits and receives data to and from the higher-level apparatus 102 through the storage IF 202.

While the CPU 206 is externally attached to the FM controller 203 in FIG. 2, the FM controller 203 may be configured as a single LSI (Large-Scale Integrated circuit) including the CPU 206 and higher-level/lower-level IFs.

The main memory 207 and the buffer 204 are constituted by a volatile storage medium. For example, the main memory 207 and the buffer 204 are constituted by a DRAM (Dynamic Random Access Memory).

The main memory 207 is a work space used by the CPU 206 for direct control and may provide a shorter latency than the buffer 204.

The buffer 204 is used for buffering of user data, storing data too large to be stored in the main memory 207, and the like.

While the main memory 207 and the buffer 204 are configured separately in FIG. 2, the main memory 207 and the buffer 204 may be configured as a single storage area.

The storage IF 202 is an IF used by the flash memory control apparatus 201 to communicate with the higher-level apparatus 102. As the storage IF 202, for example, an IF for storage such as SATA (Serial ATA), SAS (Serial Attached SCSI), and FC (Fibre Channel) may be adopted or an IF such as PCI-Express may be adopted.

An internal architecture of the flash memory control apparatus 201 need not necessarily be exactly as shown in FIG. 2. For example, respective functions included in the flash memory control apparatus 201 may be substituted by one or two or more devices.

The compression-decompression circuit 208 is a circuit for compressing and decompressing data. For example, the compression-decompression circuit 208 compresses and decompresses user data, management information in the apparatus, and the like. The flash memory control apparatus 201 need not necessarily include the compression-decompression circuit 208. In this case, compression and decompression processes may be executed by the CPU 206 which is a general-purpose processor.

Figure 3:
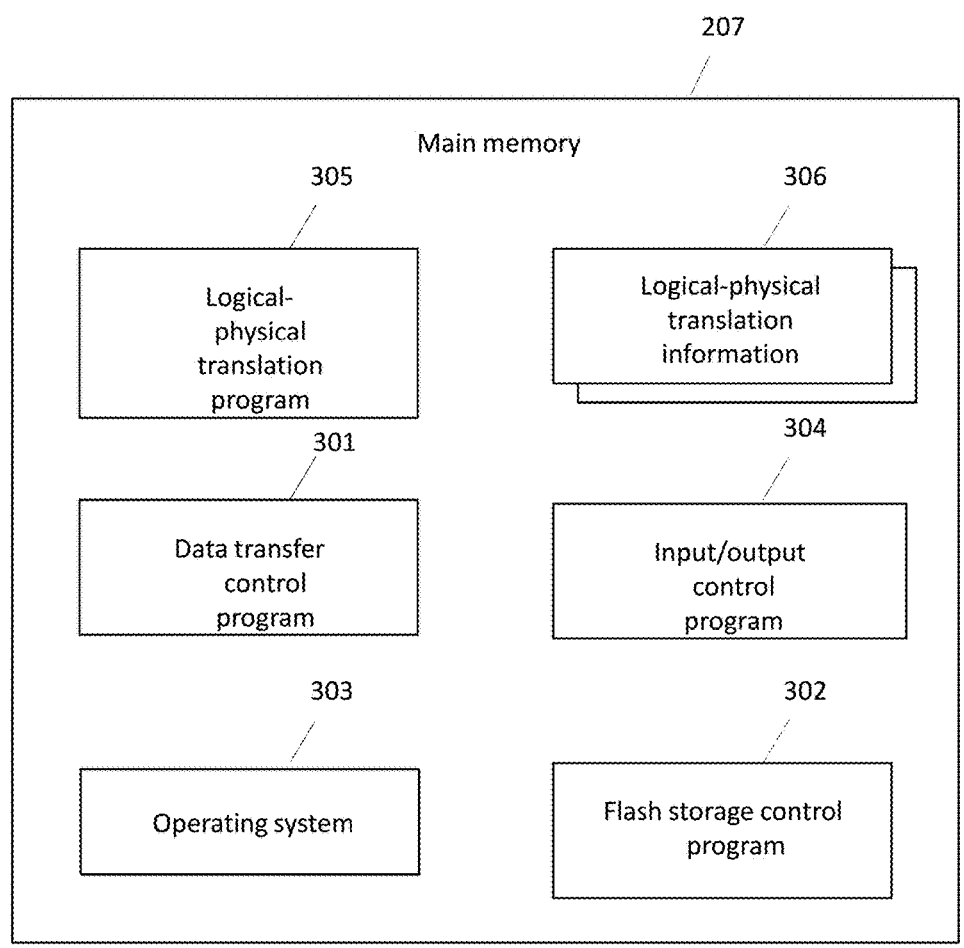
FIG. 3 shows an example of programs and information stored in a main memory.

FIG. 3 shows an example of programs and information stored in the main memory 207.

The main memory 207 stores, for example, an operating system 303, a flash storage control program 302, a data transfer control program 301, an input/output control program 304, a logical-physical translation program 305, and logical-physical translation information 306.

The operating system 303 is a program which performs basic processes such as schedule management and resource management of programs to run on the CPU 206.

The flash storage control program 302 is a program used for control to enable the flash memory control apparatus 201 to operate as a storage device such as management of a volume and management of a buffer which the flash memory control apparatus 201 provides to the higher-level apparatus 102.

The data transfer control program 301 is a program used to control the FM controller 203.

The input/output control program 304 is a program used to control the storage IF 202 and the flash memory IF 209.

The logical-physical translation program 305 is a program which uses the logical-physical translation information 306 to translate a logical address associated with an input/output request (I/O request) issued by the higher-level apparatus 102 to a physical address on the flash memory 210. A logical address according to the present embodiment may be an LBA (Logical Block Address).

The logical-physical translation information 306 includes information for translating a logical address to a physical address. In other words, the logical-physical translation information 306 includes information on a physical address of a reference destination of a logical address. The logical-physical translation information 306 may include a plurality of correspondences between a logical address and a physical address. Moreover, one or two or more pieces of the logical-physical translation information 306 stored in the main memory 207 may constitute a part of all logical-physical translation information included in the FMPKG 200. The logical-physical translation information 306 may be a partial group of records in a logical-physical translation table for managing all correspondences between logical addresses and physical addresses included in the FMPKG 200.

Figure 4:
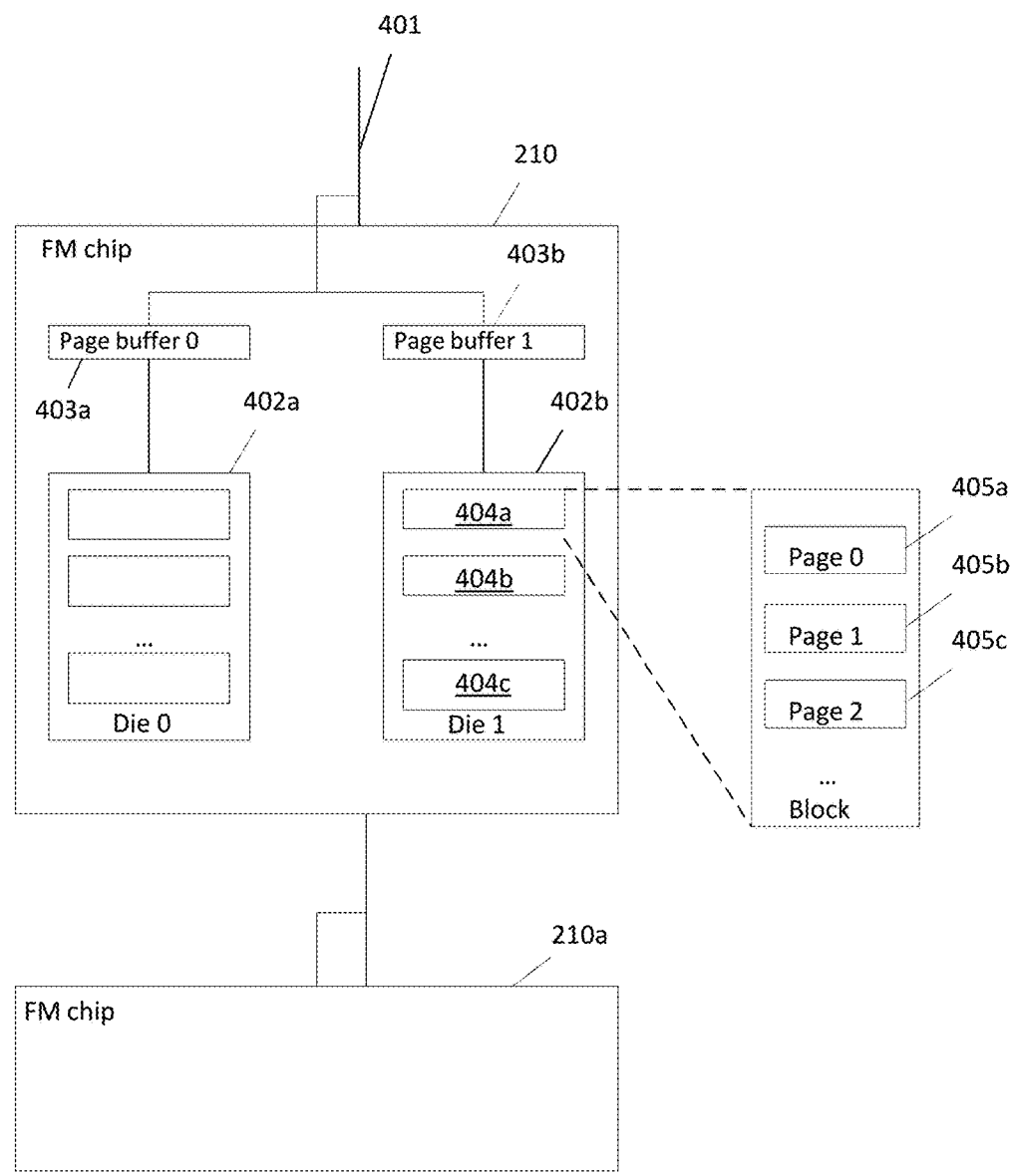
FIG. 4 shows an example of an internal configuration of a flash memory.

FIG. 4 shows an example of an internal configuration of the flash memory 210.

The flash memory 210 receives a command for write, read, erase, or the like from the flash memory IF 209 which is a coupling destination of the flash memory 210. A plurality of flash memories 210 are coupled to a flash memory bus 401. The flash memory 210 internally includes a plurality of dies 402a and 402b. The flash memory 210 includes page buffers 403a and 403b. The page buffer 403 temporarily stores target data of a flash memory I/O command issued by the flash memory control apparatus 201. The flash memory 210 includes a plurality of physical blocks 404a to 404c.

The physical block 404 is a unit in which data in the flash memory 210 is erased. In other words, data in the flash memory 210 must be erased in units of the physical blocks 404.

The physical block 404 is constituted by a plurality of physical pages 405a to 405c. The physical page 405 is a unit in which data is read from and written to the flash memory 210. In other words, data must be read from and written to the flash memory 210 in units of the physical pages 405.

A write to the flash memory 210 is to write data to a free (unused or erased) physical page 405. A read from the flash memory 210 is to read data stored on the physical page 405. With the flash memory 210, data cannot be overwritten on a written physical page 405 and data of an entire physical block 404 must be erased first. Due to the erasing process, data of each of the physical pages 405 constituting the physical block 404 is erased and, consequently, data can be written to each of the physical pages 405 once again. The erasing process must be performed in units of the physical blocks 404 and data cannot be erased from only one physical page 405.

Figure 5:
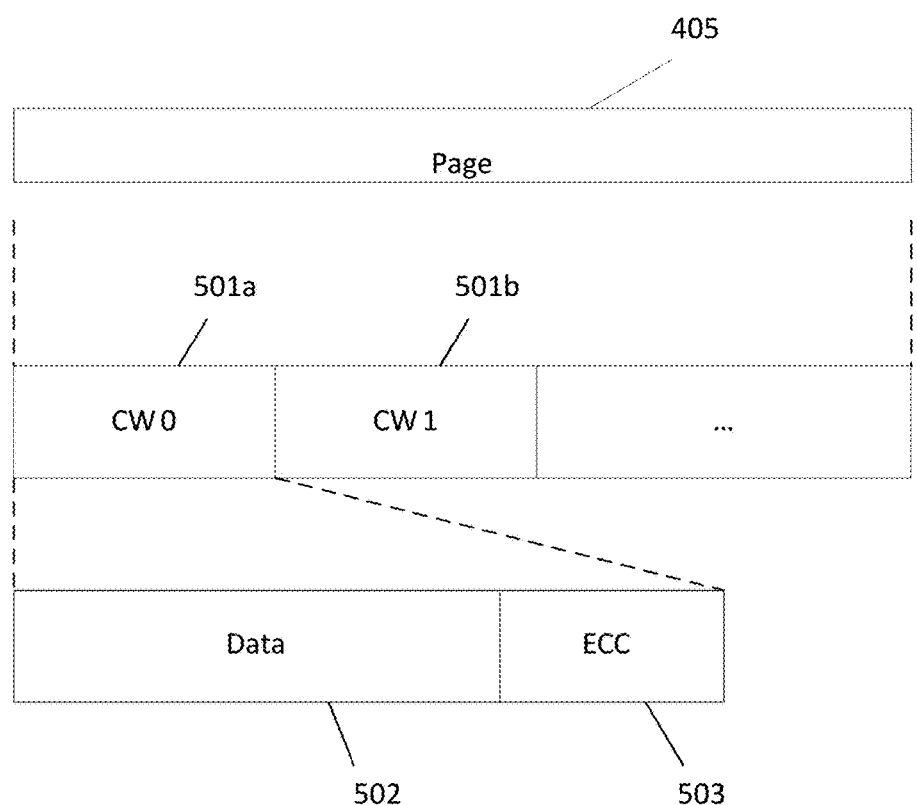
FIG. 5 shows an example of a structure of data in a physical page.

FIG. 5 shows an example of a structure of data in the physical page 405.

A CW (Code Word) 501 is constituted by a set of data 502 and an ECC (Error Check and Correction) 503 which protects the data 502. The CW 501 is a unit of data transmitted and received between the flash memory IF 209 and the flash memory 210 and is a unit of error correction of data. One or more CWs 501 are stored on the physical page 405. For example, the physical page 405 is given a size obtained by adding, to the number of bytes corresponding to a power of 2, the number of bytes corresponding to a remainder. The ECC 503 is stored in an area of the number of bytes corresponding to a remainder. The area of the number of bytes corresponding to a remainder may further store meta information.

A size of the ECC 503 is determined in accordance with a reliability level that is required of a chip. Therefore, a power of 2 cannot always be secured as a size of the data 502. In addition, the data 502 is data from the perspective of the flash memory 210. Therefore, in addition to data transmitted from the higher-level apparatus 102, the data 502 may also include metadata that is recognized by the flash memory control apparatus 201.

Examples of the size of the physical page 405 include "2 KB+α (where α denotes the number of bytes of a remainder)", "4 KB+α", and "8 KB+α". Examples of the number of physical pages constituting the physical block 404 include "128 pages" and "256 pages".

Figure 6:
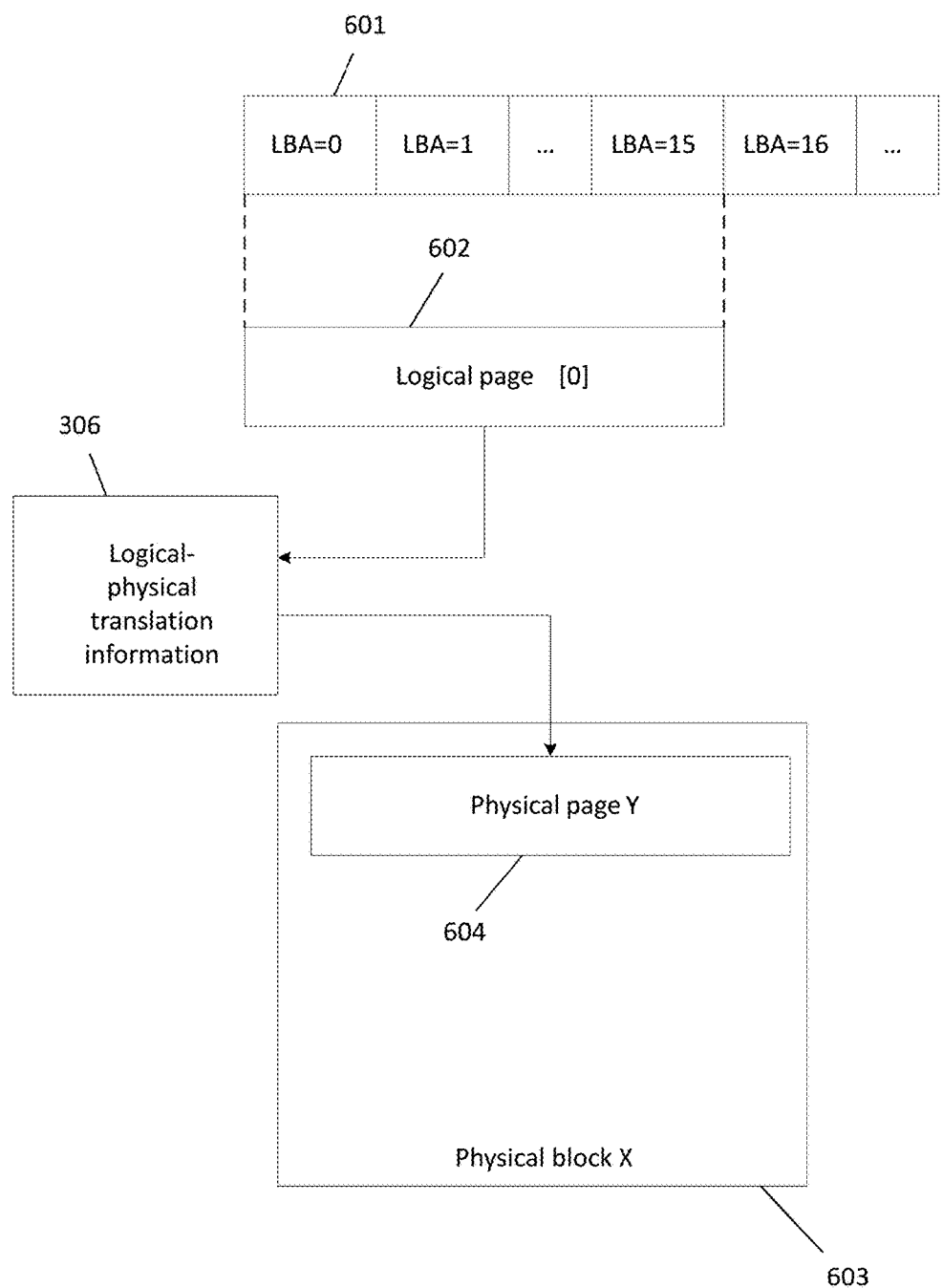
FIG. 6 shows an outline of a page-based logical-physical translation process.

FIG. 6 shows an outline of a page-based logical-physical translation process.

In the present embodiment, it is assumed that the sizes of a logical page 602 and a physical page 604 are fixed and are equal to each other. In this case, one physical page 604 corresponds to one logical page 602. One logical page 602 is constituted by a plurality of logical block addresses (LBAs) 601.

When writing data to the logical page 602, the flash memory control apparatus 201 first secures a free physical page 604. The flash memory control apparatus 201 then writes the write data intended for the logical page 602 to the secured free physical page 604. In addition, the flash memory control apparatus 201 registers (or updates) a correspondence between the logical page 602 and the physical page 604 on which the data is written in the logical-physical translation information 306. A physical page 604 originally associated with the logical page 602 is registered as an invalid physical page. The invalid physical page 604 is reclaimed and erased by reclamation and becomes a free physical page 604. Data can be written once again to such a free physical page 604.

Figure 7:
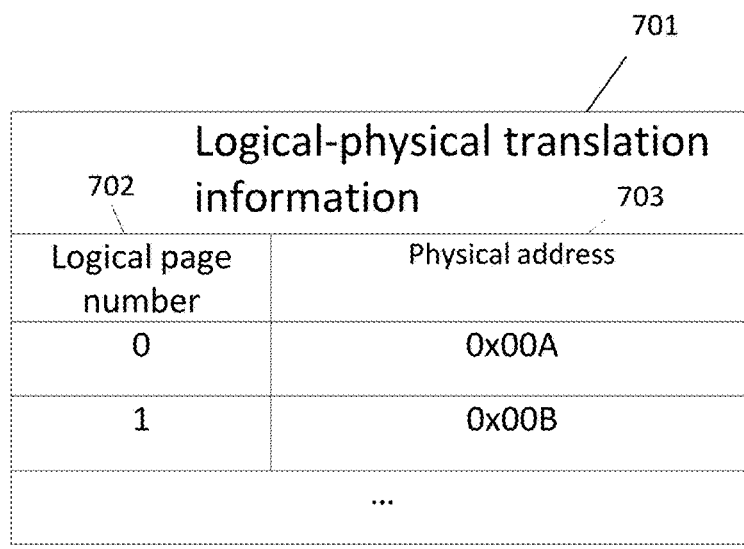
FIG. 7 shows an example of page-based logical-physical translation information.

FIG. 7 shows an example of page-based logical-physical translation information.

The logical-physical translation information 306 includes a correspondence between the logical page 602 and the physical page 604. The logical-physical translation information 306 includes a logical page number 702 and a physical address 703 as field values. The logical-physical translation information 306 may include a plurality of correspondences between the logical page number 702 and the physical address 703.

The logical page number 702 is information for uniquely identifying the logical page 602. The physical address 703 is an address of the physical page 604 associated with the logical page number 702.

For example, when an update of data is requested with respect to the logical page number 702 "1", the original physical address 703 "0x00B" corresponding to the logical page number 702 "1" in the logical-physical translation information 306 is updated to a physical address where update data is stored.

Figure 8:
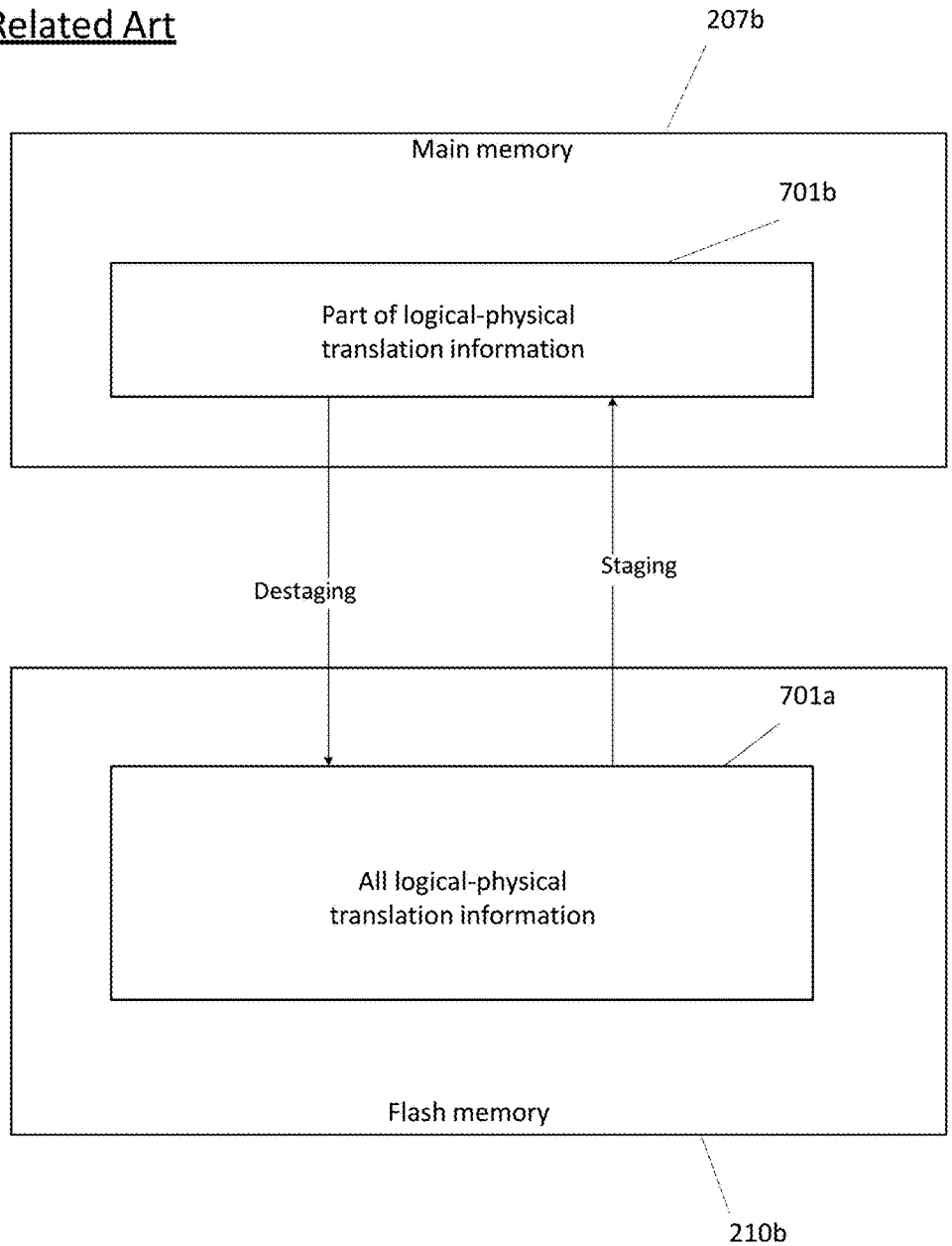
FIG. 8 shows an example of a storage mode of logical-physical translation information according to the present embodiment.

FIG. 8 shows a comparison example of a storage mode of logical-physical translation information.

In the comparison example, all logical-physical translation information 701a in an FMPKG is stored in a flash memory 210b. In addition, logical-physical translation information 701b constituting a part of all logical-physical translation information 701a is duplicated to a main memory 207b.

Figure 9:
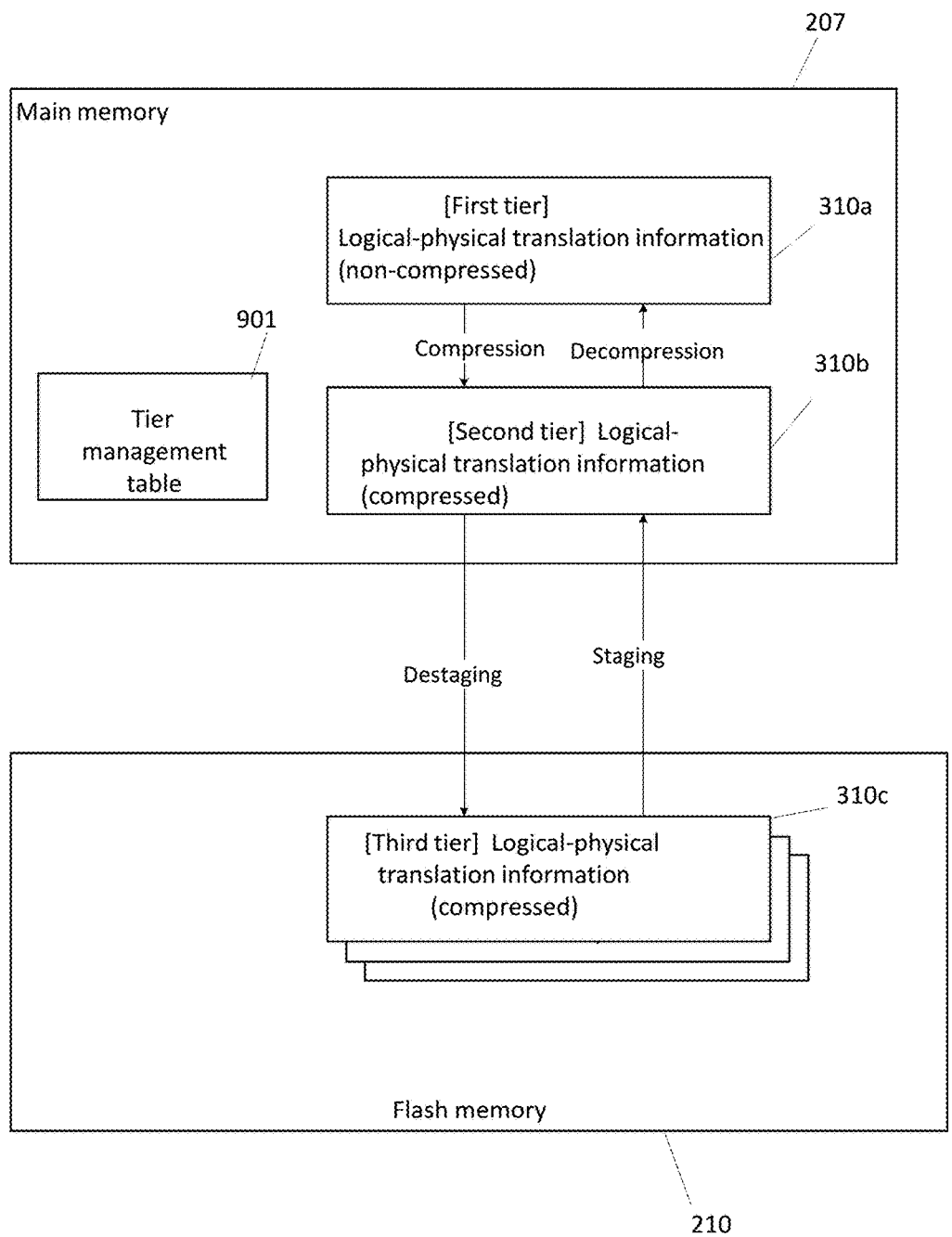
FIG. 9 is a schematic diagram for explaining a tier management system of logical-physical translation information according to the present embodiment.

FIG. 9 is a schematic diagram for explaining a tier management system of logical-physical translation information according to the present embodiment.

The main memory 207 includes a first tier area 310a which stores non-compressed logical-physical translation information 306. In addition, the main memory 207 includes a second tier area 310b which stores compressed logical-physical translation information 306. A flash memory 801 includes a third tier area 310c which stores compressed logical-physical translation information 306. Moreover, the first tier area 310a and the second tier area 310b need not necessarily be distinctly separated from each other in a storage area of the main memory 207. For example, non-compressed logical-physical translation information 306 and compressed logical-physical translation information 306 may be stored in a mixed state in one storage area of the main memory 207. Even in this case, no problem arises since which tier the logical-physical translation information 306 belongs to is managed by a tier management table 901 to be described later.

In addition, the main memory 207 includes the tier management table 901 for managing logical-physical translation information 306 stored in each tier area 310. Details of the tier management table 901 will be provided later.

One or more pieces of logical-physical translation information 306 among the plurality of pieces of logical-physical translation information 306 stored in the third tier area 310c may be duplicated to the first tier area 310a or the second tier area 310b on the main memory 207.

When the FM controller 203 duplicates (stages) one or more pieces of logical-physical translation information 306 among the plurality of pieces of logical-physical translation information 306 stored in the third tier area 310c to the second tier area 310b, since the third tier area 310c and the second tier area 310b are both areas where compressed logical-physical translation information 306 is stored, the one or more pieces of logical-physical translation information 306 may be duplicated in a compressed state. When the FM controller 203 migrates the logical-physical translation information 306 in the second tier area 310b to the first tier area 310a, since the first tier area 310a is an area where non-compressed logical-physical translation information 306 is stored, compressed logical-physical translation information 306 is migrated after being decompressed. Conversely, when the FM controller 203 migrates logical-physical translation information 306 in the first tier area 310a to the second tier area 310b, since the second tier area 310b is an area where compressed logical-physical translation information 306 is stored, non-compressed logical-physical translation information 306 is migrated after being compressed.

Since the logical-physical translation information 306 in the first tier area 310a is non-compressed, the logical-physical translation information 306 can be used as-is (without decompressing). Since the logical-physical translation information in the second tier area 310b is compressed, the logical-physical translation information must be used after decompression. Since the logical-physical translation information 306 in the third tier area 310c is also compressed, the logical-physical translation information 306 must be used after decompression.

Since decompression takes time, using the logical-physical translation information 306 in the first tier area 310a improves I/O response performance as compared to using the logical-physical translation information 306 in the second tier area 310b. However, storing the logical-physical translation information 306 in the first tier area 310a consumes a larger capacity of the main memory 207 than storing the logical-physical translation information 306 in the second tier area 310b.

In addition, since the main memory 207 has a higher I/O rate than the flash memory 210, using the logical-physical translation information 306 in the second tier area 310b improves I/O response performance as compared to using the logical-physical translation information 306 in the third tier area 310c. However, storing the logical-physical translation information 306 in the second tier area 310b consumes a larger capacity of the main memory 207.

Therefore, I/O response performance can be improved by appropriately storing the logical-physical translation information 306 having a high possibility of being accessed (used) in the first tier area 310a and the second tier area 310b in accordance with the capacity of the main memory 207.

Moreover, tier areas in which the logical-physical translation information 306 is stored are not limited to three tiers. For example, the flash memory 210 may be provided with a tier area which is positioned between the second tier and the third tier and which stores non-compressed logical-physical translation information 306. For example, the main memory 207 need not include one of the first tier area 310a and the second tier area 310b.

The main memory 207 may be provided with a tier area which is positioned between the first tier area 310a and the second tier area and which stores logical-physical translation information 306 compressed according to a compression method which has a lower compression rate than the second tier area 310b but which can be decompressed in a shorter period of time.

When the logical-physical translation information 306 in the main memory 207 is updated, the FM controller 203 reflects the update on the logical-physical translation information 306 which is stored in the third tier area 310c in the flash memory 210 and which corresponds to the updated logical-physical translation information 306. The FM controller 203 may perform this reflection immediately or after a certain amount of differential data (dirty data) has been accumulated. In the case of the latter, the FM controller 203 may evacuate the differential data (dirty data) in the main memory 207 to the flash memory 210 when supply of power is stopped and power is being supplied from the battery 205.

Figure 10:
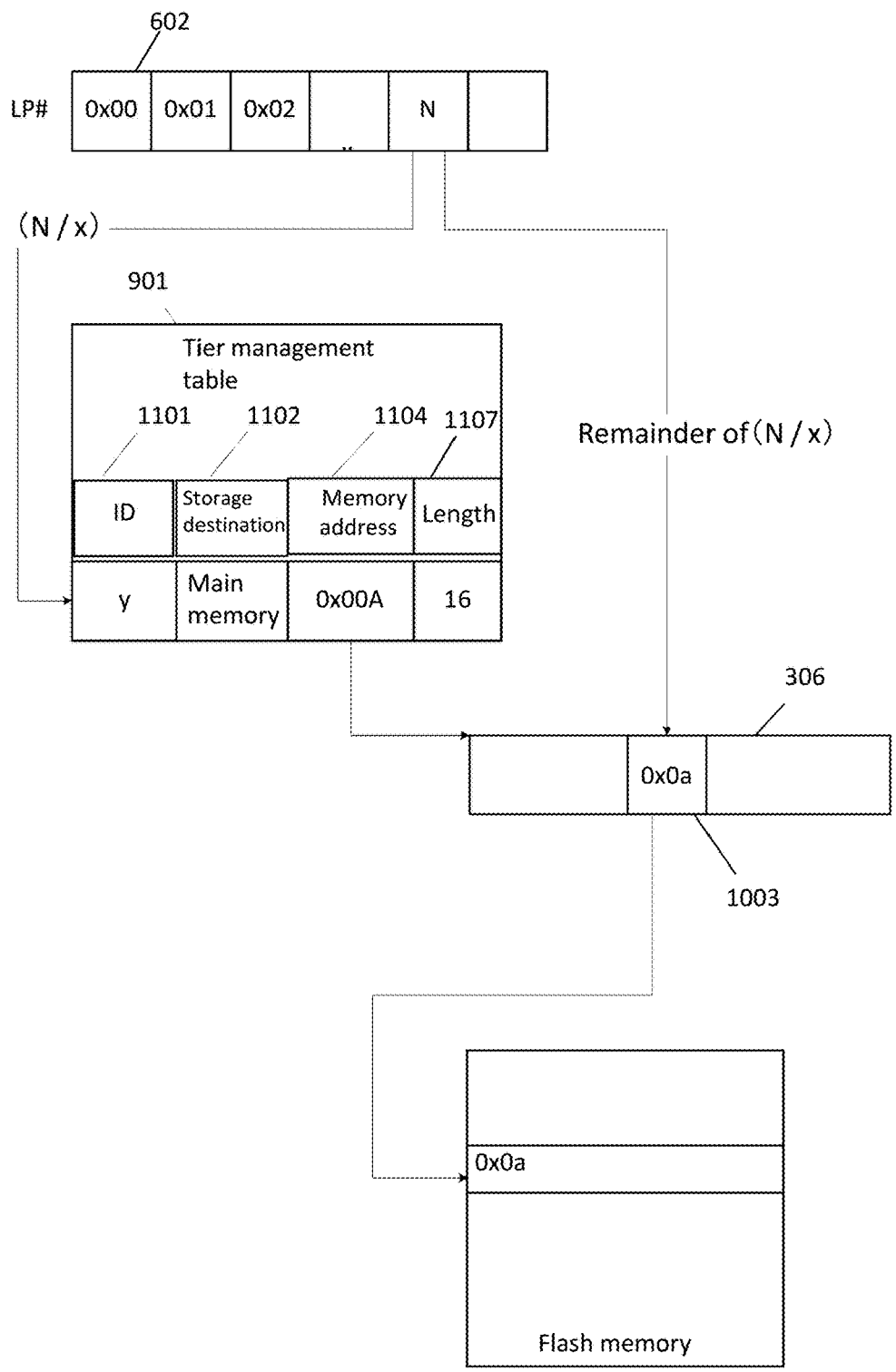
FIG. 10 is a schematic diagram for explaining a management mode of logical-physical translation information according to a tier management table.

FIG. 10 is a schematic diagram for explaining a management mode of logical-physical translation information according to the tier management table 901.

All correspondences between logical pages and physical pages in the present embodiment are managed in a shared manner by a plurality of pieces of logical-physical translation information 306. The tier management table 901 manages logical-physical translation information 306 stored in each tier area 310. Hereinafter, an example of a process of translating a logical page number into a physical address of a physical page will be described with reference to FIG. 10.

Let us assume that a quotient (an integer value) of a division of a logical page number N being a unit of logical-physical translation by the number of logical pages "x" managed by one piece of logical-physical translation information 306 represents a logical-physical translation information ID 1101 "y" and that a remainder (an integer value) of the division represents an offset address of the piece of logical-physical translation information 306.

The logical-physical translation program 305 identifies a record including the calculated logical-physical translation information ID 1101 "y" from the tier management table 901. In addition, based on a storage destination 1102 of the identified record, the logical-physical translation program 305 learns that, for example, a location where the logical-physical translation information 306 is stored is the main memory 207. Furthermore, based on a memory address 1104 of the identified record, the logical-physical translation program 305 learns that, for example, an address of the main memory 207 where the logical-physical translation information 306 is stored is "0x00A". Subsequently, the logical-physical translation program 305 acquires a value "0x0a" of a position advanced by an offset address from the address "0x00A". The acquired value "0x0a" is an address of a physical page corresponding to the logical page number N.

FIG. 11 shows a configuration example of the tier management table 901.

The tier management table 901 includes, as field values, the logical-physical translation information ID 1101, the storage destination 1102, a state 1103, the memory address 1104, a first FM address 1105, a second FM address 1106, a length 1107, a forward pointer 1108, a rearward pointer 1109, and a frequency 1110.

The logical-physical translation information ID 1101 is information for uniquely identifying the logical-physical translation information 306. The logical-physical translation information ID 1101 may be calculated from a logical page number.

The storage destination 1102 is information indicating a storage destination of latest logical-physical translation information 306 with the logical-physical translation information ID 1101. For example, when there is logical-physical translation information 306 having been staged from the flash memory 210 to the main memory 207 and the logical-physical translation information 306 in the main memory 207 is updated last, the storage destination 1102 is the "main memory".

The state 1103 is information for identifying compressed/non-compressed. Compressed/non-compressed is information indicating in which of a compressed state or a non-compressed state the logical-physical translation information 306 with the logical-physical translation information ID 1101 is stored in the main memory 207 or the flash memory 210.

The state 1103 may further include information for identifying dirty/clean. Dirty/clean is information indicating whether the logical-physical translation information 306 with the logical-physical translation information ID 1101 in the main memory 207 or the flash memory 210 is dirty or clean. The logical-physical translation information 306 of which the state 1103 is "clean" means that the logical-physical translation information 306 has already been destaged. The logical-physical translation information 306 of which the state 1103 is "dirty" means that the logical-physical translation information 306 has not yet been destaged. The storage destination 1102 and the state 1103 may be expressed by a single field value.

The memory address 1104 indicates a position (an address) on the main memory 207 where the logical-physical translation information 306 with the logical-physical translation information ID 1101 is stored. The memory address 1104 of the logical-physical translation information 306 having been destaged to the flash memory 210 and deleted from the main memory 207 is "NULL".

The first FM address 1105 and the second FM address 1106 indicate positions (addresses) on the flash memory where the logical-physical translation information 306 with the logical-physical translation information ID 1101 is stored. The logical-physical translation information 306 may be stored in a mirrored state (a redundant state) at two positions including the position indicated by the first FM address 1105 and the position indicated by the second FM address 1106. This is because the logical-physical translation information 306 is important information which becomes lost data when erased.

The length 1107 is information indicating a data length of the logical-physical translation information 306 with the logical-physical translation information ID 1101. When the logical-physical translation information 306 is compressed, the length 1107 indicates a data length after compression. The length 1107 may be expressed with 512 bytes being a block size of SCSI as one unit.

The forward pointer 1108 and the rearward pointer 1109 are information regarding a queue for managing the logical-physical translation information 306 with the logical-physical translation information ID 1101. Details of the forward pointer 1108 and the rearward pointer 1109 will be provided later (refer to FIG. 14).

The frequency 1110 is information indicating an access (use) frequency of the logical-physical translation information 306 with the logical-physical translation information ID 1101. In other words, the frequency 1110 is information indicating an access frequency to a logical page managed by the logical-physical translation information 306. The frequency 1110 is used to determine a storage destination of the logical-physical translation information 306.

For example, the logical-physical translation information 306 of which the frequency 1110 is equal to or higher than a first threshold in the third tier area 310c may be duplicated (staged) to the second tier area 310b.

For example, the logical-physical translation information 306 of which the frequency 1110 is equal to or higher than a second threshold (where second threshold>first threshold) in the second tier area 310b may be duplicated (staged) to the first tier area 310a.

For example, the logical-physical translation information 306 of which the frequency 1110 ranges from highest to X-th highest (where X is a positive integer equal to or larger than 1) among all frequencies 1110 may be managed in the first tier area 310a, and the logical-physical translation information 306 of which the frequency 1110 ranges from (X+1)-th to (X+Y)-th highest (where Y is a positive integer equal to or larger than 1) among all frequencies 1110 may be managed in the second tier area 310b.

Moreover, the logical-physical translation program 305 may be configured not to allocate a physical page to a logical page for which a write request has never been received and to allocate a physical page to a logical page when a write request is received for the first time.

In FIG. 11, a record 910a indicates that the logical-physical translation information 306 with the logical-physical translation information ID "0" has been stored "non-compressed" in the main memory (1102) (stored in the first tier area 310a) but is in a "dirty" state (1103). In other words, it is shown that data corresponding to the length 1107 "16" from the memory address 1104 "0x001" awaits destaging.

A record 910b indicates that the logical-physical translation information 306 with the logical-physical translation information ID "1" has been stored "compressed" in the main memory (1102) (stored in the second tier area 310b) but is in a "clean" state (1103). In other words, it is shown that data corresponding to the length 1107 "8" from the memory address 1104 "0x002" can be erased.

A record 910c indicates that the logical-physical translation information 306 with the logical-physical translation information ID "2" has been stored "compressed" in the flash memory (1102) (stored in the third tier area 310c) and is not stored in the main memory (NULL). In other words, it is shown that the logical-physical translation information 306 is not staged to the main memory.

A record 910d indicates that the logical-physical translation information 306 with the logical-physical translation information ID "3" is free and does not have entity data.

In addition, as shown in FIG. 24, a tier management table 901b may further include a priority 1111 as a field value. The priority 1111 indicates a degree of priority of the logical-physical translation information 306 with the logical-physical translation information ID 1101. The priority 1111 may be configured by a user or may be automatically configured by the storage controller 110 or the FM controller 203. For example, the logical-physical translation information 306 of which the priority 1111 is "high" may be managed in the first tier area 310a, the logical-physical translation information 306 of which the priority 1111 is "intermediate" may be managed in the second tier area 310b, and the logical-physical translation information 306 of which the priority 1111 is "low" may be managed in the third tier area 310c.

Figure 12:
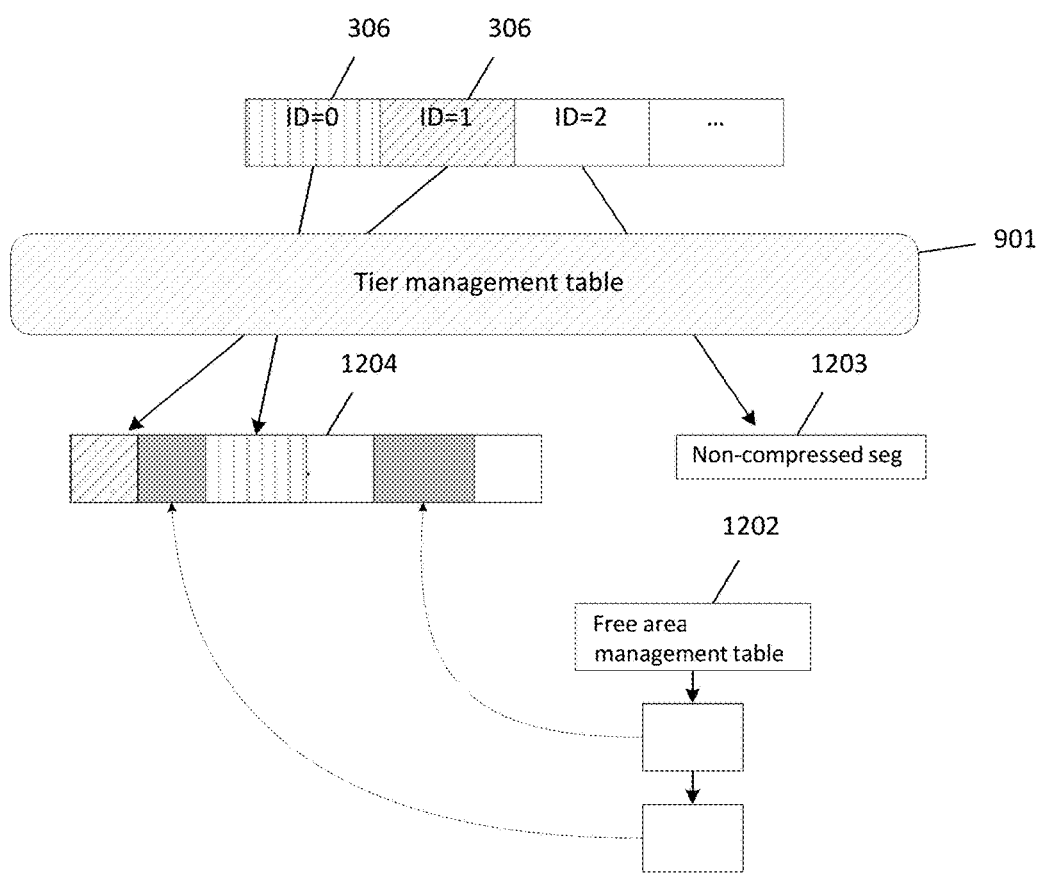
FIG. 12 is a schematic diagram for explaining a management method of logical-physical translation information stored in a main memory.

FIG. 12 is a schematic diagram for explaining a management method of the logical-physical translation information 306 stored in the main memory 207.

Non-compressed logical-physical translation information 306 and a cache segment area 1203 may have a one-to-one correspondence. In consideration thereof, the first tier area 310a which stores non-compressed logical-physical translation information 306 is constituted by a plurality of cache segment areas 1203 having a prescribed size. In addition, one piece of non-compressed logical-physical translation information 306 is stored in one cache segment area 1203.

However, since a data size of the compressed logical-physical translation information 306 differs depending on a compression rate, different data sizes must be accommodated. In consideration thereof, the second tier area 310b which stores compressed logical-physical translation information 306 is constituted by a plurality of segment group areas 1204 having a larger size than ordinary cache segment areas 1203. In addition, one or two or more pieces of compressed logical-physical translation information 306 are stored in one segment group area 1204.

Each piece of logical-physical translation information 306 stored in the second tier area 310b is subject to staging and destaging. The logical-physical translation information 306 staged or destaged from the second tier area 310b is invalidated in the segment group area 1204. In other words, invalid areas may be fragmentarily created in the segment group area 1204. In consideration thereof, the FM controller 203 may manage a free area (a usable area) in the segment group area 1204 and may discard the invalid areas by executing garbage collection once the free area falls below a prescribed threshold. The FM controller 203 may execute garbage collection using a free area management table 1202 which manages free areas of each segment group area 1204. Alternatively, the FM controller 203 may execute garbage collection based on a reclamation system by patrolling logical addresses to be described later.

Figure 13:
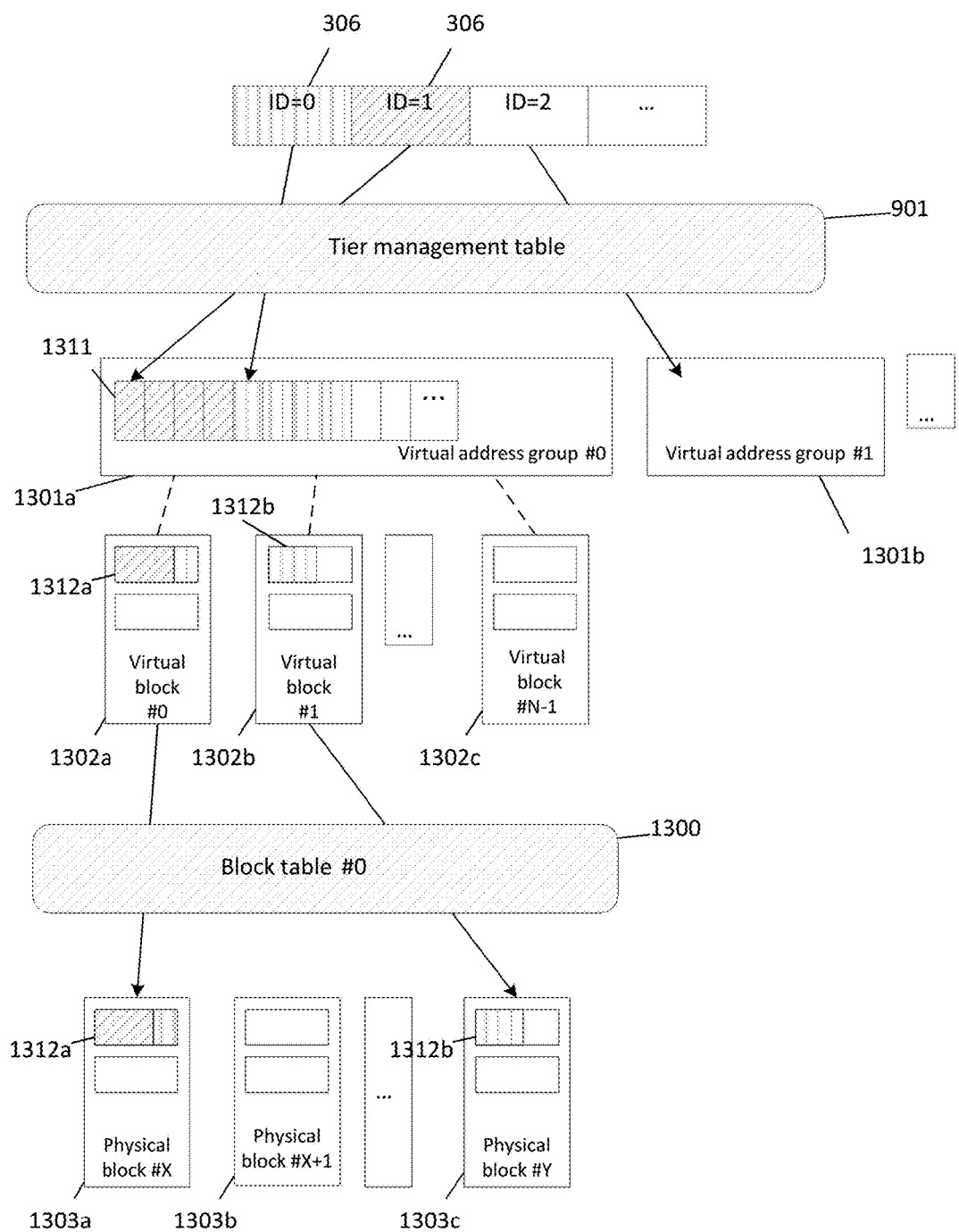
FIG. 13 is a schematic diagram for explaining a management method of logical-physical translation information stored in a flash memory.

FIG. 13 is a schematic diagram for explaining a management method of the logical-physical translation information 306 stored in the flash memory 210.

In order to store compressed logical-physical translation information 306 of which the data size changes in a physical page in an efficient manner, the third tier area 310c in the flash memory 210 may be configured as described below.

The third tier area 310c is constituted by a virtual address group 1301 formed by continuously imparting virtual addresses to a group constituted by a plurality of physical blocks. The third tier area 310c may be constituted by a plurality of the virtual address groups 1301.

In addition, the virtual address group 1301 is constituted by a plurality of virtual blocks 1302. One virtual block 1302 is associated with one physical block 1303. A correspondence between the virtual block 1302 and the physical block 1303 is managed by a block table 1300. The block table 1300 may be stored in the main memory 207.

Updating of the logical-physical translation information 306 in the third tier area 310c is performed in, for example, units of virtual blocks as described below.

(1) The virtual block 1302 storing the compressed logical-physical translation information 306 that is an update target is identified. When the compressed logical-physical translation information 306 is stored so as to straddle two virtual blocks 1302, the two virtual blocks 1302 are identified.

(2) The compressed logical-physical translation information 306 that is an update target is read and decompressed from a physical page of the physical block 1303 corresponding to the identified virtual block 1302. In addition, the read logical-physical translation information 306 is updated.

(3) The updated logical-physical translation information 306 is compressed and written to a physical page of a free physical block 1303. At this point, physical pages not written in the physical block 1303 may be padded by prescribed data.

(4) In the block table 1300, the identified virtual block 1302 is associated with the physical block 1303 in which the updated logical-physical translation information 306 has been stored.

FIG. 14 shows a configuration example of a queue used when selecting logical-physical translation information 306 for staging/destaging.

The queue is configured such that each piece of logical-physical translation information 306 is connected in two directions by the forward pointer 1108 and the rearward pointer 1109. The queue may be configured for each tier area 310.

A head 1401a indicates a start address of a queue to which the logical-physical translation information 306 of which the state 1103 is "dirty" is connected in the logical-physical translation information 306 stored in the first tier area 310a. In other words, the head 1401a indicates that the logical-physical translation information 306 corresponding to the queue connected to the head 1401a is "dirty" (in other words, not yet destaged) in the first tier area 310a. Therefore, by referring to the queue connected to the head 1401a, the logical-physical translation information 306 that is a destaging target in the first tier area 310a can be identified.

A head 1401b indicates a start address of a queue to which the logical-physical translation information 306 of which the state 1103 is "clean" is connected in the logical-physical translation information 306 stored in the first tier area 310a. In other words, the head 1401b indicates that the logical-physical translation information 306 corresponding to the queue connected to the head 1401b is "clean" (in other words, already destaged) in the first tier area 310a. Therefore, by referring to the queue connected to the head 1401b, the logical-physical translation information 306 that is an erasure target in the first tier area 310a can be identified.

A head 1401c indicates a start address of a queue to which the logical-physical translation information 306 of which the state 1103 is dirty is connected in the logical-physical translation information 306 stored in the second tier area 310b. This connection queue is used in a similar manner to the head 1401a in the first tier area 310a described above.

A head 1401d indicates a start address of a queue to which the logical-physical translation information 306 of which the state 1103 is clean is connected in the logical-physical translation information 306 stored in the second tier area 310b. This connection queue is used in a similar manner to the head 1401b in the first tier area 310a described above.

An arrangement of the queues may be sorted in a descending order of frequencies 1110 of the logical-physical translation information 306. Alternatively, the arrangement of the queues may be simply sorted in accordance with a policy such as LRU (Least Recently Used).

Figure 15:
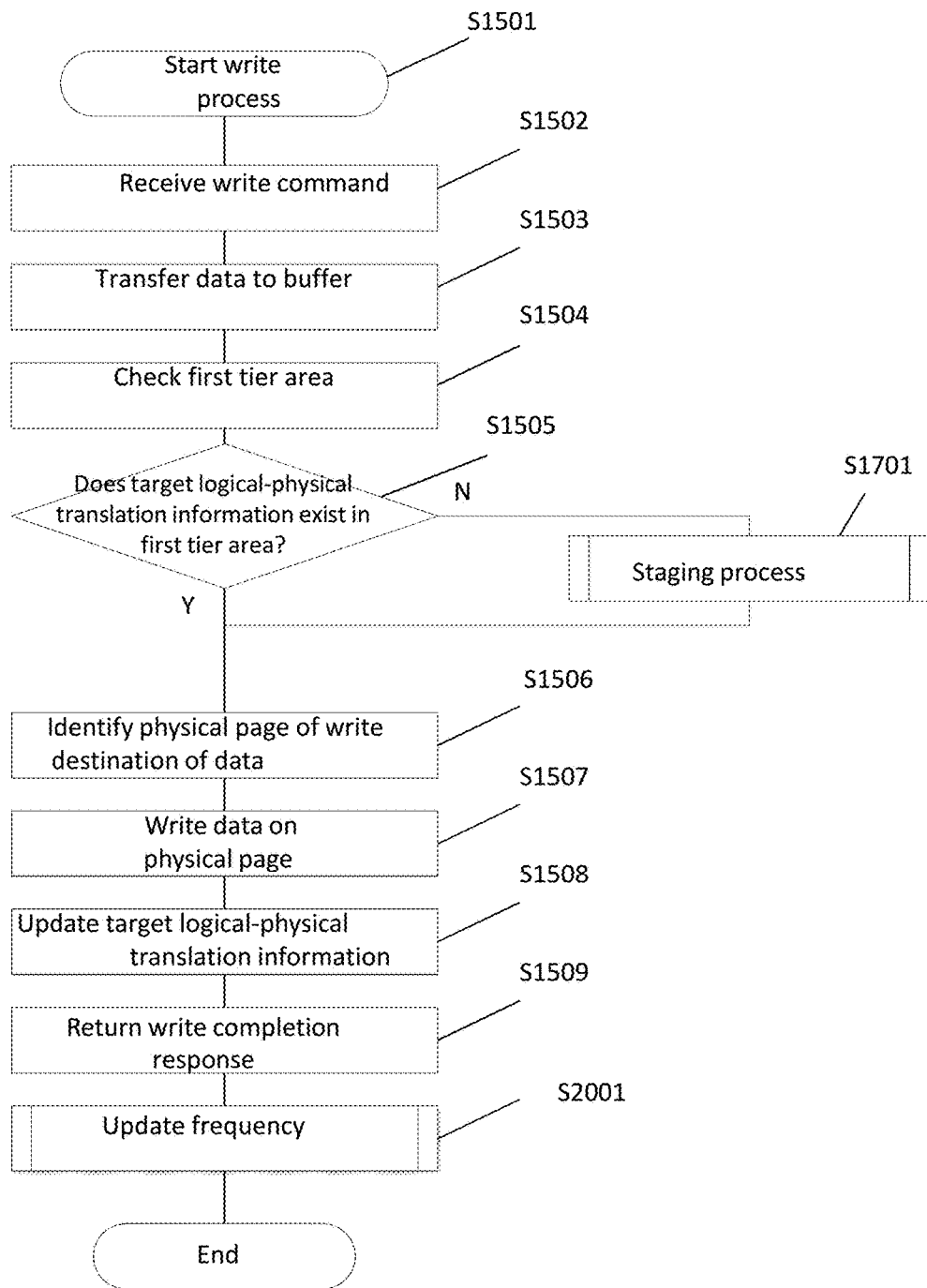
FIG. 15 is a flow chart showing an example of a write process.

FIG. 15 is a flow chart showing an example of a write process.

When the FM controller 203 receives a write command and write data from the higher-level apparatus 102 (S1502), the FM controller 203 starts the following process. The write command may be a SCSI command or the like.

The FM controller 203 stores the received write data in the buffer 204 (S1503). Next, the FM controller 203 acquires a logical address of a write destination from the write command. Then, the FM controller 203 identifies a logical page number corresponding to the logical address. Subsequently, the FM controller 203 refers to the tier management table 901 and determines whether or not logical-physical translation information 306 including the identified logical page number (referred to as "target logical-physical translation information 306" in the description of the present drawing) is stored in the first tier area 310a (S1504).

When the target logical-physical translation information 306 is stored in the first tier area 310a (S1505: YES), the FM controller 203 advances to S1506. When the target logical-physical translation information 306 is not stored in the first tier area 310a (S1505: NO), the FM controller 203 executes a staging process (S1701). Details of the staging process will be provided later (refer to FIG. 17). Due to this process, the target logical-physical translation information 306 can be migrated (staged) to the first tier area 310a. The FM controller 203 then advances to subsequent S1506.

Next, the FM controller 203 acquires the target logical-physical translation information 306 from the first tier area 310a (S1506). In addition, the FM controller 203 refers to the target logical-physical translation information 306 and identifies a physical page having a correspondence with the logical page number (S1506).

Subsequently, the FM controller 203 writes the write data in the buffer 204 to the identified physical page (S1507). When data is already stored in the identified physical page, the FM controller 203 writes the write data to a free physical page. When data is already stored in the identified physical page and a size of the write data is smaller than a size of the physical page, the FM controller 203 writes the write data to a free physical page by read-modify-write.

In addition, the FM controller 203 updates the correspondence between the logical page and the physical page in the target logical-physical translation information 306 (S1508). Next, the FM controller 203 returns a write completion response to the higher-level apparatus 102 (S1509). Alternatively, the FM controller 203 may return a write completion response to the higher-level apparatus 102 at a time point of storing the write data in the buffer 204 (S1503). In this case, the flash memory control apparatus 201 may include a component (the battery 205, for example) for guaranteeing data in the case of an unexpected power interruption and the like.

Subsequently, the FM controller 203 executes a frequency updating process (S2001) and ends the present process. Details of the frequency updating process (S2001) will be provided later (refer to FIG. 20).

While the description provided above concerns a write process in response to a write command from the higher-level apparatus 102, a write process triggered by a reclamation process or a refresh process is substantially the same.

Figure 16:
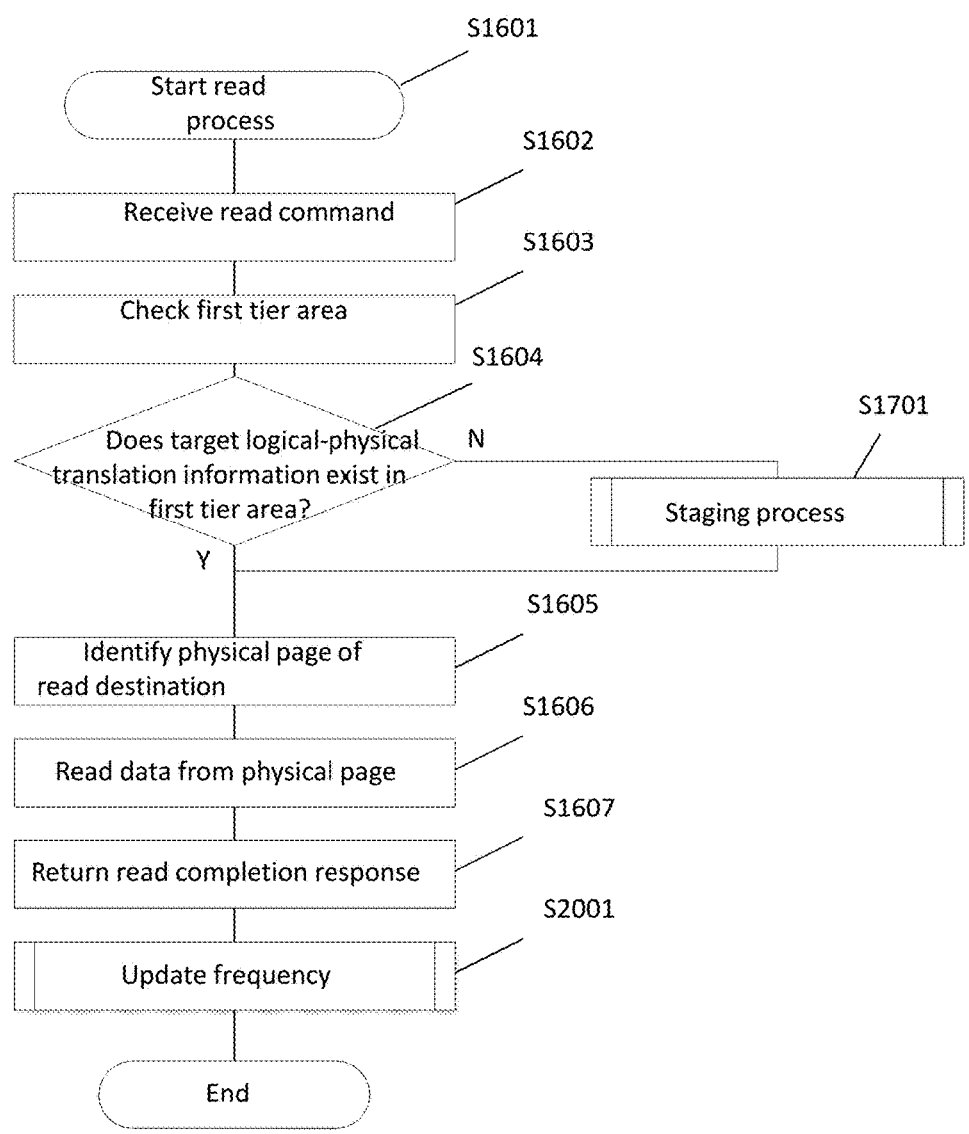
FIG. 16 is a flow chart showing an example of a read process.

FIG. 16 is a flow chart showing an example of a read process.

When the FM controller 203 receives a read command from the higher-level apparatus 102 (S1602), the FM controller 203 starts the following process.

The FM controller 203 acquires a logical address of a read destination of the read command. Then, the FM controller 203 identifies a logical page number corresponding to the logical address. Subsequently, the FM controller 203 refers to the tier management table 901 and determines whether or not logical-physical translation information 306 including the identified logical page number (referred to as "target logical-physical translation information 306" in the description of the present drawing) is stored in the first tier area 310a (S1603).

When the target logical-physical translation information 306 is stored in the first tier area 310a (S1604: YES), the FM controller 203 advances to S1605. When the target logical-physical translation information 306 is not stored in the first tier area 310a (S1604: NO), the FM controller 203 executes the staging process (S1701). Details of the staging process will be provided later (refer to FIG. 17). Due to this process, the target logical-physical translation information 306 can be migrated (staged) to the first tier area 310a. The FM controller 203 then advances to subsequent S1605.

Next, the FM controller 203 acquires the target logical-physical translation information 306 from the first tier area 310a. In addition, the FM controller 203 refers to the target logical-physical translation information 306 and identifies a physical page having a correspondence with the logical page number (S1605).

Subsequently, the FM controller 203 reads data from the identified physical page (S1606). Next, the FM controller 203 returns a read completion response and the read data to the higher-level apparatus 102 (S1607).

Subsequently, the FM controller 203 executes the frequency updating process (S2001) and ends the present process. Details of the frequency updating process (S2001) will be provided later (refer to FIG. 20).

Figure 17:
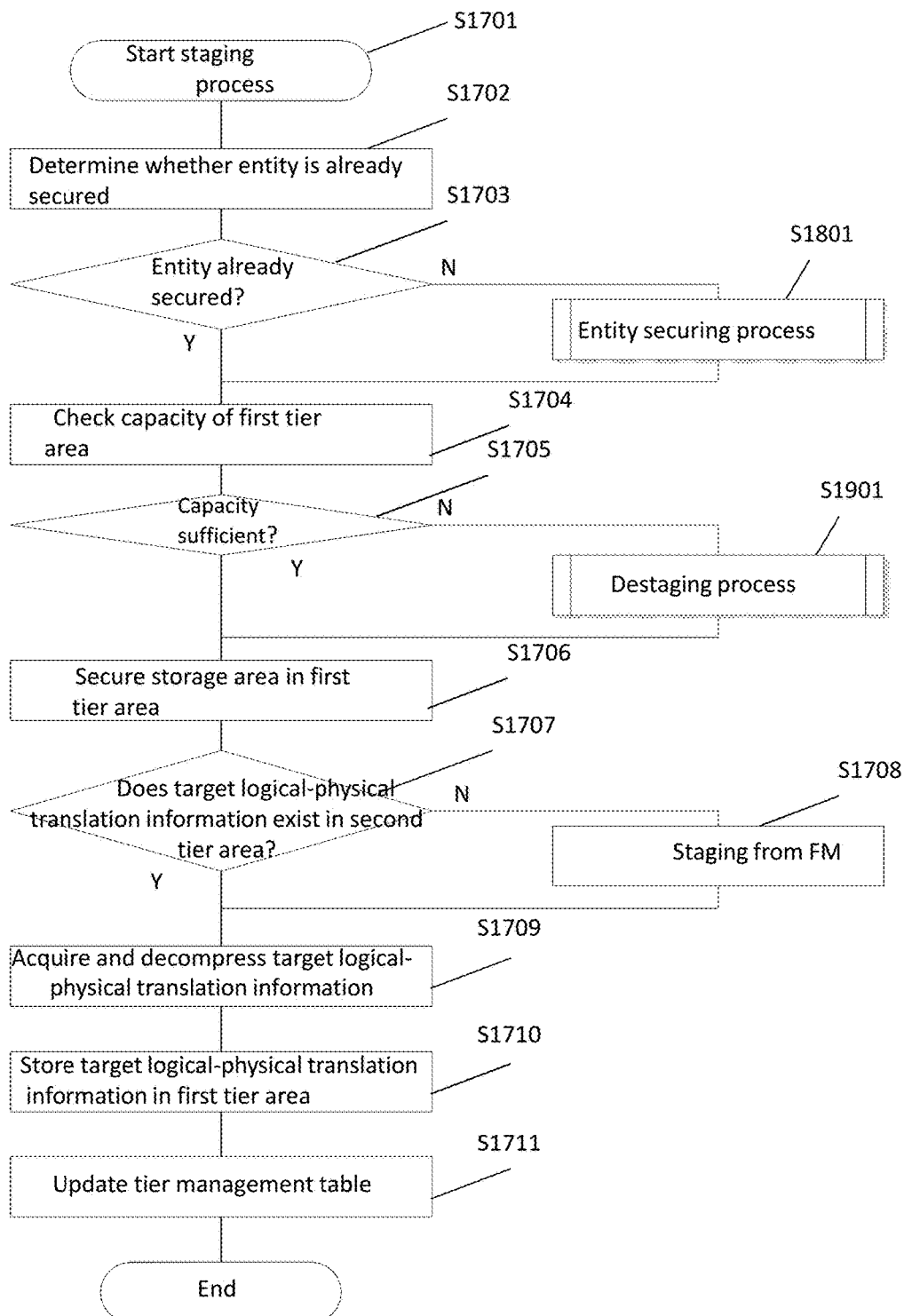
FIG. 17 is a flow chart showing an example of a staging process.

FIG. 17 is a flow chart showing an example of a staging process. The present process corresponds to S1701 in FIGS. 15 and 16.

The FM controller 203 determines whether or not an entity of the target logical-physical translation information 306 has already been secured (S1702). Having already secured an entity means that the entity of the logical-physical translation information 306 has been secured in any of the tier areas 310. In other words, the entity of the logical-physical translation information 306 is not secured in any of the tier areas 310 until the logical-physical translation information 306 is used for the first time, and the entity is secured only after the logical-physical translation information 306 is used.

When the entity of the target logical-physical translation information 306 is already secured (S1703), the FM controller 203 advances to S1704. When the entity of the target logical-physical translation information 306 has not been secured (S1703), the FM controller 203 executes an entity securing process (S1801) of the target logical-physical translation information 306 and then advances to S1704. Details of the entity securing process will be provided later (refer to FIG. 18).

Next, the FM controller 203 checks an available capacity of the first tier area 310a (S1704). The available capacity may be a sum of a capacity of free areas and a capacity of clean areas in the first tier area 310a.

When the available capacity is equal to or larger than a threshold (S1705: YES), the FM controller 203 advances to S1706. When the available capacity is smaller than the threshold (S1705: NO), the FM controller 203 executes a destaging process (S1901) to increase the available capacity of the first tier area 310a and then advances to S1706. Details of the destaging process (S1901) will be provided later (refer to FIG. 19).

Next, the FM controller 203 secures a storage area in the first tier area 310a (S1706). In addition, the FM controller 203 determines whether or not the target logical-physical translation information 306 exists in the second tier area 310*b* (S1707).

When the target logical-physical translation information 306 exists in the second tier area 310*b* (S1707: YES), the FM controller 203 advances to S1709.

When the target logical-physical translation information 306 does not exist in the second tier area 310*b* (in other words, when the target logical-physical translation information 306 exists in the third tier area 310*c*) (S1707: NO), the FM controller 203 stages the target logical-physical translation information 306 from the third tier area 310*c* to the second tier area 310*b* (S1708) and then advances to S1709. In this case, since the target logical-physical translation information 306 in the third tier area 310*c* is already compressed, the FM controller 203 may duplicate the target logical-physical translation information 306 in the compressed state to the second tier area 310*b*.

Next, the FM controller 203 decompresses the target logical-physical translation information 306 in the second tier area 310*b* (S1709), and stores the decompressed (non-compressed) target logical-physical translation information 306 in the storage area secured in the first tier area 310*a* in S1706 (S1710).

Subsequently, the FM controller 203 updates the storage destination 1102, the memory address 1104, and the like of the target logical-physical translation information 306 in the tier management table 901 (S1711), and ends the present process.

Figure 18:
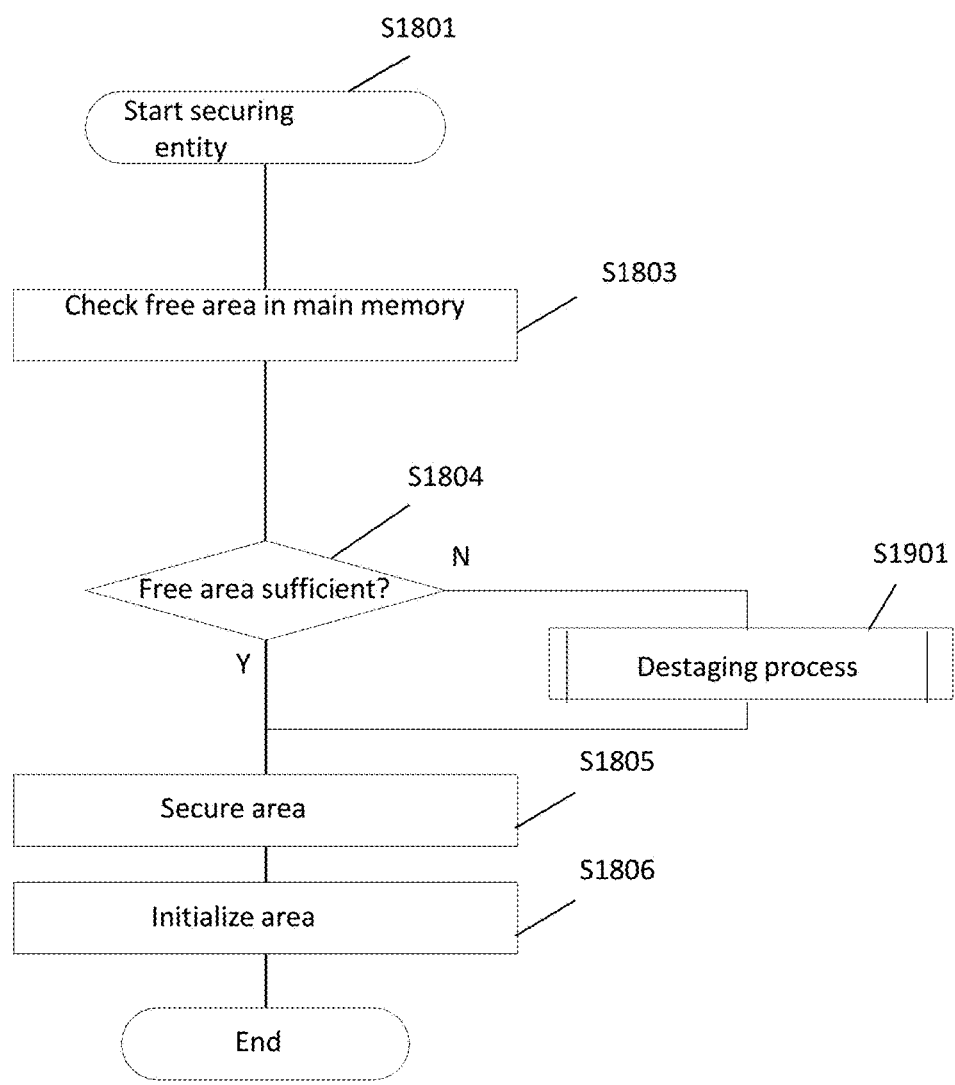
FIG. 18 is a flow chart showing an example of an entity securing process of logical-physical translation information.

FIG. 18 is a flow chart showing an example of an entity securing process of the logical-physical translation information 306. The present process corresponds to S1801 in FIG. 17.

The present process is a process of generating an entity of the logical-physical translation information 306 in any of the tier areas 310. The present process is executed when the logical-physical translation information 306 is used for the first time or when the logical-physical translation information 306 having been once completely freed is used for the first time.

The FM controller 203 checks the available capacity of the first tier area 310*a* (S1803). When the available capacity of the first tier area 310*a* is equal to or larger than a threshold (S1804: YES), the FM controller 203 advances to S1805.

When the available capacity of the first tier area 310*a* is smaller than the threshold (S1804: NO), the FM controller 203 executes the destaging process (S1901) with respect to the first tier area 310*a* and then advances to S1805. Details of the destaging process (S1901) will be provided later (refer to FIG. 19). Accordingly, an available area of the first tier area 310*a* increases.

Next, the FM controller 203 secures a storage area for the logical-physical translation information 306 in the first tier area 310*a* (S1805). In addition, the FM controller 203 initializes the secured storage area (S1806) and ends the present process. In other words, the FM controller 203 generates an entity of the logical-physical translation information 306 in the storage area. Initialization may be, for example, a process of filling each entry included in the logical-physical translation information 306 with a pre-scribed value indicating an unallocated state.

Figure 19:
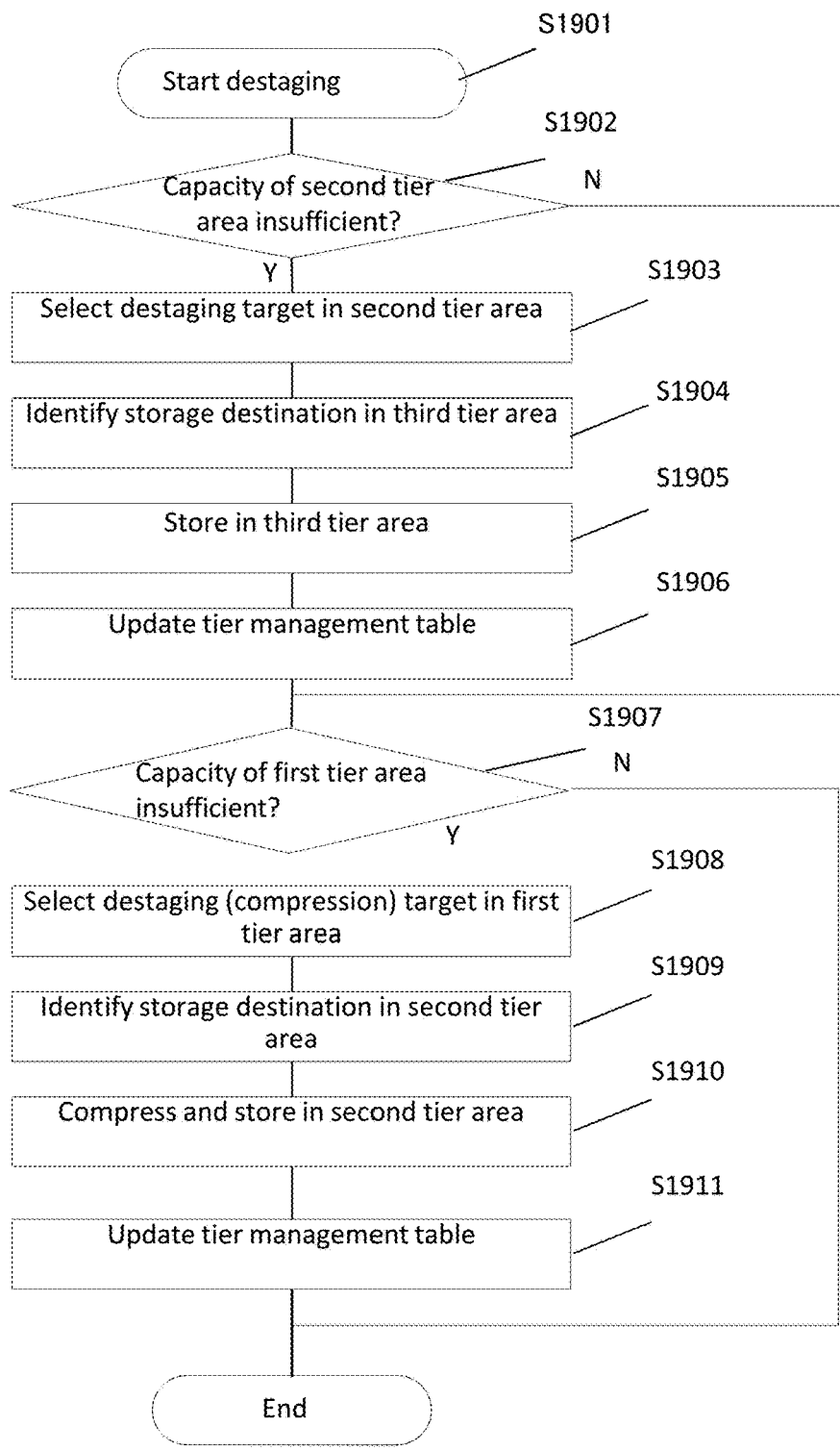
FIG. 19 is a flow chart showing an example of a destaging process.

FIG. 19 is a flow chart showing an example of a destaging process.

The destaging process accommodates both destaging from the first tier area 310*a* to the second tier area 310*b* in the main memory 207 and destaging from the second tier area 310*b* to the third tier area 310*c*. The respective destaging processes may be executed at different opportunities.

The FM controller 203 determines whether or not an available capacity of the second tier area 310*b* is smaller than a threshold (S1902). The available capacity may be a sum of a capacity of free areas and a capacity of clean areas in the second tier area 310*b*.

When the available capacity of the second tier area 310*b* is equal to or larger than the threshold (S1902: NO), the FM controller 203 advances to S1907.

When the available capacity of the second tier area 310*b* is smaller than the threshold (S1902: YES), the FM controller 203 selects the logical-physical translation information 306 that is a destaging target in the second tier area 310*b* (S1903). The FM controller 203 may select the logical-physical translation information 306 of which the frequency 1110 is lowest in the second tier area 310*b* as the destaging target. In this case, a queue indicating the selected logical-physical translation information 306 may be connected to an end of a queue 1401*c* (refer to FIG. 14) which manages dirty of the second tier area 310*b*.

Subsequently, the FM controller 203 identifies a storage destination in the third tier area 310*c* of the selected logical-physical translation information 306 (S1904). In addition, the FM controller 203 stores the selected logical-physical translation information 306 in the identified storage destination in the third tier area 310*c* (S1905). In this case, the FM controller 203 may store the logical-physical translation information 306 in the compressed state to the third tier area 310*c* (a flash memory). Furthermore, since the logical-physical translation information 306 is duplexed in the flash memory, the selected logical-physical translation information 306 may be written to two locations in the third tier area 310*c*.

Subsequently, the FM controller 203 updates the tier management table 901 and the queues 1401*c* and 1401*d* (S1906).

Due to this process, the logical-physical translation information 306 in the second tier area 310*b* is destaged to the third tier area 310*c*.

Next, the FM controller 203 determines whether or not an available capacity of the first tier area 310*a* is smaller than a threshold (S1907).

When the available capacity of the first tier area 310*a* is equal to or larger than the threshold (S1907: NO), the FM controller 203 ends the present process.

When the available capacity of the first tier area 310*a* is smaller than the threshold (S1907: YES), the FM controller 203 selects the logical-physical translation information 306 that is a compression target in the first tier area 310*a* (S1908). For example, the FM controller 203 may select the logical-physical translation information 306 of which the frequency 1110 is lowest in the first tier area 310*a* as a destaging target (the compression target). In this case, a queue indicating the selected logical-physical translation information 306 may be connected to an end of a queue 1401*a* (refer to FIG. 14) which manages dirty of the first tier area 310*a*.

Subsequently, the FM controller 203 identifies a storage destination in the second tier area 310*b* (S1909). In addition, the FM controller 203 compresses the logical-physical translation information 306 selected in S1908 and stores the selected logical-physical translation information 306 in the identified storage destination in the second tier area 310*b* (S1910).

Next, the FM controller 203 updates the tier management table 901 and the queues 1401a and 1401b (S1911), and ends the process.

Figure 20:
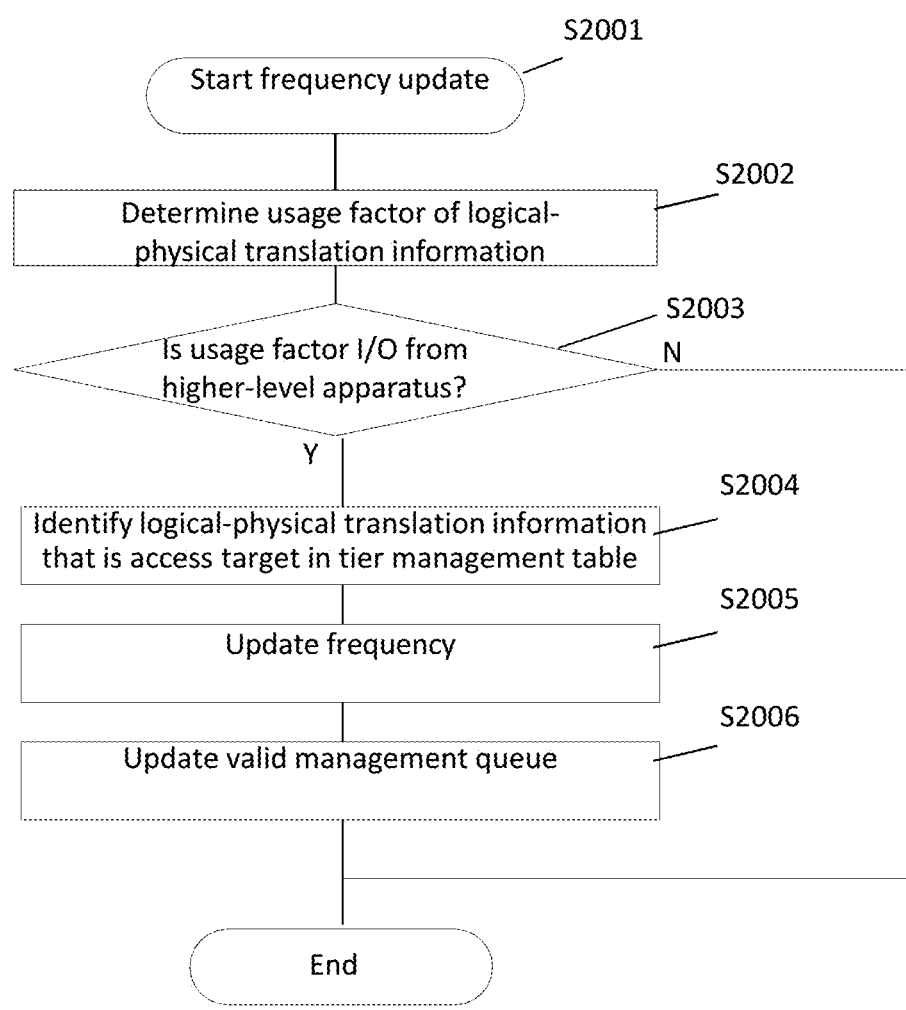
FIG. 20 is a flow chart showing an example of a frequency updating process.

FIG. 20 is a flow chart showing an example of a frequency updating process. The present process corresponds to S2001 in FIGS. 15 and 16.

When the logical-physical translation information 306 is used, the FM controller 203 determines a usage factor of the logical-physical translation information 306 (S2002). When the usage factor is not an I/O from the higher-level apparatus 102 (S2003: NO), the FM controller 203 ends the present process. This is because, when the usage factor is not an I/O from the higher-level apparatus 102 but an I/O due to an internal factor (such as reclamation or refresh), an access to a logical page using the logical-physical translation information 306 is not caused by a locality of the I/O and therefore does not apply to the following process.

When the usage factor is an I/O from the higher-level apparatus 102 (S2003: YES), the FM controller 203 identifies the logical-physical translation information 306 that is a use target in the tier management table 901 (S2004). In addition, in the tier management table 901, the FM controller 203 updates (counts up) the frequency 1110 corresponding to the identified logical-physical translation information 306 (S2005).

Subsequently, the FM controller 203 sorts an arrangement of queues which manage valid logical-physical translation information 306 based on the frequency 1110 (S2006), and ends the present process. Moreover, when simple LRU is used on the queue arrangement, the frequency 1110 need not be used.

Figure 21:
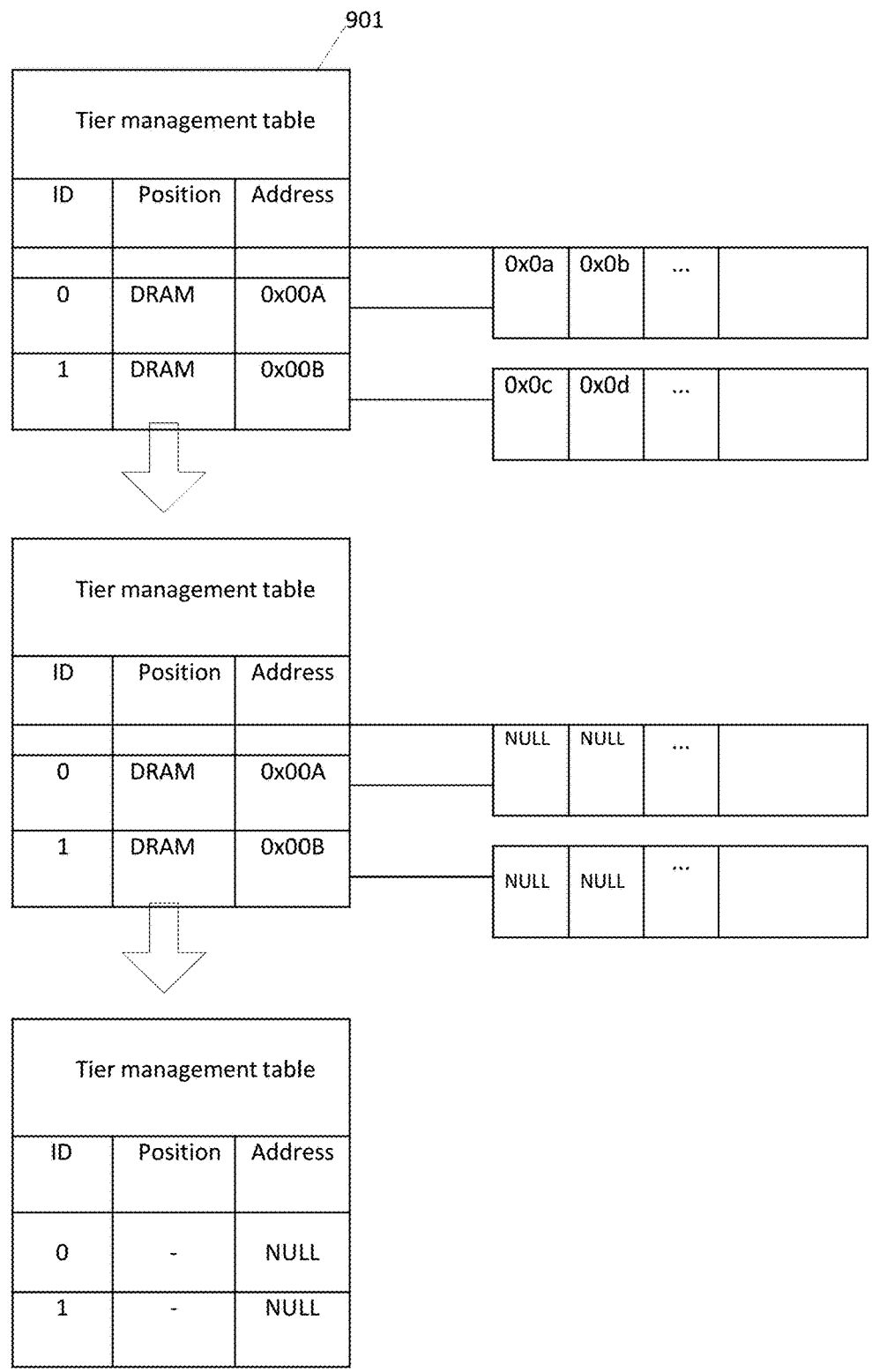
FIG. 21 shows an outline of a freeing process of logical-physical translation information.

FIG. 21 shows an outline of a freeing process of the logical-physical translation information 306.

The logical-physical translation information 306 after securing an entity includes entity data. However, when logical-physical translation information 306 which does not include any valid correspondence between a logical page number and a physical page (hereinafter, referred to as a "valid entry") continues to include entity data, storage areas of the main memory 207 and the flash memory 210 are to be consumed in a wasteful manner. In other words, utilization efficiencies of the main memory 207 and the flash memory 210 decline. In consideration thereof, with respect to logical-physical translation information 306 no longer including a valid entry, entity data is freed. Accordingly, utilization efficiencies of the main memory 207 and the flash memory 210 can be improved. Moreover, in the tier management table 901, a storage destination of a record related to the logical-physical translation information 306 of which entity data has been freed may be changed to "NULL" and a state thereof may be changed to "unallocated".

Figure 22:
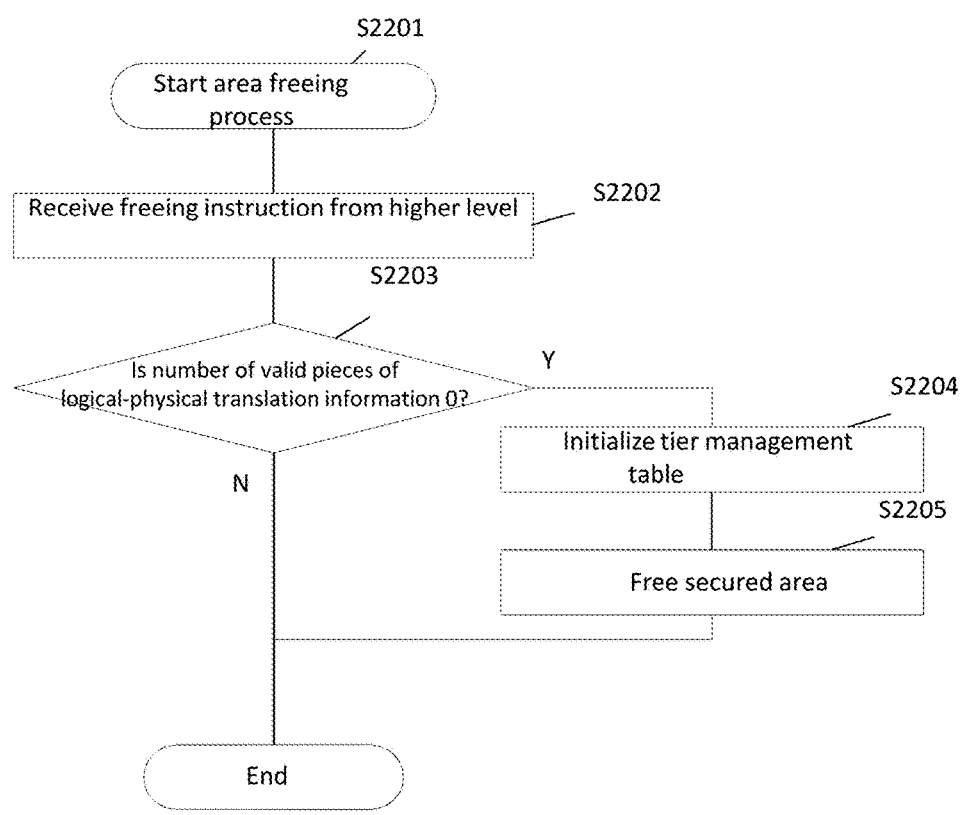
FIG. 22 is a flow chart showing an example of a freeing process of logical-physical translation information.

FIG. 22 is a flow chart showing an example of a freeing process of the logical-physical translation information 306.

For example, when the FM controller 203 receives a command to free the logical-physical translation information 306 from the higher-level apparatus 102 (S2202), the FM controller 203 starts the following process.

The FM controller 203 identifies the logical-physical translation information 306 related to a logical address specified in the command to free the logical-physical translation information 306. In addition, the FM controller 203 counts the number of valid entries included in the identified logical-physical translation information 306.

Subsequently, the FM controller 203 determines whether or not the number of valid entries is "0" (in other words, whether or not valid entries do not exist) (S2203). Moreover, the flash memory control apparatus 201 may retain a table including a correspondence between the logical-physical translation information 306 and the number of valid entries included in the logical-physical translation information 306 and manage the number of valid entries using the table. Alternatively, the flash memory control apparatus 201 may include a prescribed hardware circuit and may count the number of valid entries using the hardware circuit.

When the number of valid entries is not "0" (in other words, when valid entries exist) (S2203: NO), the FM controller 203 ends the present process. In other words, the entity data of the identified logical-physical translation information 306 is not freed.

When the number of valid entries is "0" (in other words, when valid entries do not exist) (S2203: YES), the FM controller 203 performs a freeing process. Specifically, in the tier management table 901, the FM controller 203 sets a storage destination of a record related to the identified logical-physical translation information 306 to "NULL" and sets a state thereof to "unallocated" (S2204). In addition, the FM controller 203 frees the entity data of the logical-physical translation information 306 (S2205), and ends the present process.

When a target of freeing entity data of the logical-physical translation information 306 is the flash memory 210, the FM controller 203 may invalidate areas indicated by the FM addresses 1105 and 1106 in the tier management table 901.

When a target of freeing entity data of the logical-physical translation information 306 is the main memory 207, the FM controller 203 may connect an area indicated by the memory address 1104 in the tier management table 901 to a dirty management queue and invalidate the area indicated by the memory address 1104.

Figure 23:
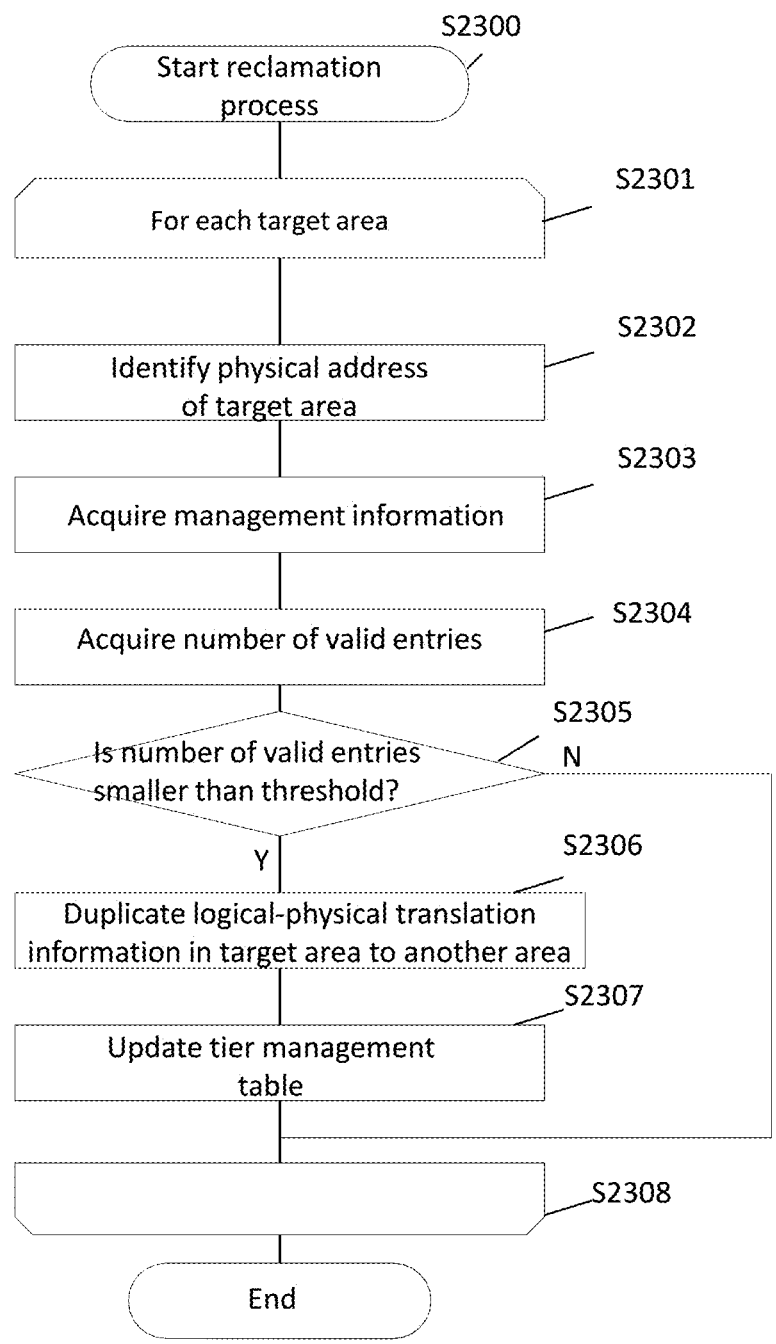
FIG. 23 is a flow chart showing a reclamation process of an area storing logical-physical translation information.

FIG. 23 is a flow chart showing a reclamation process of an area storing the logical-physical translation information 306.

When staging and destaging of the logical-physical translation information 306 are executed, storage areas in the main memory 207 and the flash memory 210 become fragmented and invalid areas increase. Therefore, invalid areas must be regularly reclaimed. This is referred to as reclamation. Reclamation may be a process of organizing allocation destinations of logical pages using a table for managing a pointer (a reverse pointer) from a physical address (a physical page) to a logical address (a logical page). Alternatively, when a size (space) of an area storing the logical-physical translation information 306 is sufficiently smaller than a size (space) of an area storing user data, reclamation may be a process of organizing allocation destinations of logical pages by patrolling a logical space without using the table including the reverse pointer.

The FM controller 203 executes the process of S2301 to S2302 described below with respect to each cache segment area 1203 (in the case of the first tier area 310a), each segment group area 1204 (in the case of the second tier area 310b), or each virtual address group (in the case of the third tier area 310c) in which the logical-physical translation information 306 is stored. In this case, an area that is a target of the process of S2301 to S2302 will be referred to as a target area.

The FM controller 203 identifies a physical address of a target area (S2302). Subsequently, the FM controller 203 acquires information (referred to as "management information") which manages the identified physical address (S2303).

The FM controller 203 acquires the number of valid entries in the target area from the acquired management information (S2304). The management information may be management information used in ordinary reclamation.

When the number of valid entries is equal to or larger than a threshold (S2305: NO), the FM controller 203 advances to S2308. In other words, the FM controller 203 does not consider the logical-physical translation information 306 related to this target area as a reclamation target.

When the number of valid entries is smaller than the threshold (S2305: YES), the FM controller 203 duplicates the logical-physical translation information 306 related to this target area to another area (S2306). In other words, the FM controller 203 considers the logical-physical translation information 306 related to this target area as a reclamation target. In addition, the FM controller 203 updates the main memory address 1104 or the flash memory addresses 1105 and 1106 in the tier management table 901 (S2307), and advances to S2308.

In S2308, when there remains an unprocessed target area, the FM controller 203 returns to S2301, but when no unprocessed target area remains, the FM controller 203 ends the present process (S2308).

By regularly executing the reclamation process described above, a proportion of fragmented storage areas in the main memory 207 and the flash memory 210 can be kept below a certain level.

The embodiment described above merely represents an example for illustrating the present invention, and it is to be understood that the scope of the present invention is not limited to the embodiment. It will be obvious to those skilled in the art that the present invention can be implemented in various other modes without departing from the spirit of the present invention.

The main memory 207 according to the present embodiment may represent one type of the first storage device. The flash memory 210 may represent one type of the second storage device. In this case, the second storage device may be configured to have a slower I/O rate and a larger storage capacity than the first storage device.

A tier area according to the present embodiment may be referred to as a "tier". For example, the first tier area 310a may be referred to as "tier 1".

A logical page according to the present embodiment may be a logical page in accordance with thin provisioning. In other words, a physical page may not be allocated to the logical page until the logical page receives a data write indication, and a physical page may be allocated to the logical page once the logical page receives a data write indication.

REFERENCE SIGNS LIST

101 Storage system
102 Storage controller
113 Flash memory storage apparatus
200 Flash memory package
203 Flash memory controller
207 Main memory
210 Flash memory

The invention claimed is:
1. A storage apparatus, comprising:
a first storage device;
a second storage device; and
a controller configured to control the first storage device and the second storage device,
in logical-physical translation information which associates logical pages constituting a logical storage area of the second storage device and physical pages constituting a physical storage area of the second storage device with each other,
the logical-physical translation information stored in a non-compressed state in the first storage device belongs to a first tier
the logical-physical translation information stored in a compressed state in the first storage device belongs to a second tier, and
the logical-physical translation information stored in a compressed state in the second storage device belongs to a third tier,
the controller being configured to include tier management information for managing which logical page is included in the logical-physical translation information of which of the first tier, the second tier, and the third tier, and
the controller being configured to, when receiving an I/O (Input/Output) with respect to a logical page, retrieve the logical-physical translation information including information denoting the logical page for which the I/O has been received, based on the tier management information.

2. The storage apparatus according to claim 1, wherein the second storage device is configured to have a slower I/O rate and a larger storage capacity than the first storage device.

3. The storage apparatus according to claim 2, wherein the controller is configured to,
when retrieving logical-physical translation information including information denoting the logical page for which the I/O has been received based on the tier management information,
preferentially retrieve logical-physical translation information belonging to the first tier over logical-physical translation information belonging to the second tier, and
preferentially retrieve logical-physical translation information belonging to the second tier over logical-physical translation information belonging to the third tier.

4. The storage apparatus according to claim 2, wherein the controller is configured to
duplicate logical-physical translation information, out of logical-physical translation information belonging to the third tier, of which an I/O frequency indicating a frequency of I/O to a logical page included in the logical-physical translation information is equal to or higher than a first threshold, to the first storage device in a compressed state, and cause the duplicated logical-physical translation information to belong to the second tier, and
decompress logical-physical translation information, out of logical-physical translation information belonging to the second tier, of which the I/O frequency is equal to or higher than a second threshold, which is higher than the first threshold, to bring the logical-physical translation information into a non-compressed state, and cause the logical-physical translation information to belong to the first tier.

5. The storage apparatus according to claim 4, wherein the controller is configured to
delete from the second storage device logical-physical translation information, out of logical-physical translation information belonging to the second tier, of which the I/O frequency is lowest, and bring logical-physical translation information, out of logical-physical translation information belonging to the first tier, of which the I/O frequency is lowest into a compressed state, and cause the logical-physical translation information to belong to the second tier.

6. The storage apparatus according to claim 5, wherein the I/O frequency is a value based on access to the logical page from an external apparatus.

7. The storage apparatus according to claim 2, wherein the tier management information includes a storage location in the first storage device, a storage location in the second storage device, and a data size of the logical-physical translation information, relating to the logical-physical translation information, and
the data size is
a data size in a non-compressed state when the logical-physical translation information belongs to the first tier, and
a data size in a compressed state when the logical-physical translation information belongs to the second tier or the third tier.

8. The storage apparatus according to claim 2, wherein the controller is configured to
cause logical-physical translation information, of which a priority indicating a degree of priority of the logical-physical translation information is equal to or higher than a first threshold, to belong to the first tier, and
cause logical-physical translation information, of which the priority is equal to or higher than a second threshold and lower than the first threshold, to belong to the second tier.

9. The storage apparatus according to claim 1, wherein the second storage device is constituted by a NAND flash memory.

10. A storage control method used in a storage apparatus including a first storage device and a second storage device, the method comprising:
receiving an I/O with respect to a logical page, and
retrieving logical-physical translation information including information denoting the logical page for which the I/O has been received, based on tier management information,
in regard to the logical-physical translation information which associates logical pages constituting a logical storage area of the second storage device and physical pages constituting a physical storage area of the second storage device with each other,
the logical-physical translation information stored in a non-compressed state in the first storage device to belong to a first tier,
the logical-physical translation information stored in a compressed state in the first storage device to belong to a second tier,
the logical-physical translation information stored in a compressed state in the second storage device to belong to a third tier, and
the tier management information for managing which logical page is included in the logical-physical translation information of which of the first tier, the second tier, and the third tier.

* * * * *